(12) United States Patent
Fukuda et al.

(10) Patent No.: US 8,395,673 B2
(45) Date of Patent: Mar. 12, 2013

(54) SHOOTING DEVICE AND METHOD WITH FUNCTION FOR GUIDING AN OBJECT TO BE SHOT

(75) Inventors: Mitsuaki Fukuda, Kawasaki (JP); Toshio Endoh, Kawasaki (JP); Takahiro Aoki, Kawasaki (JP); Masaki Watanabe, Kawasaki (JP); Takayuki Sugiura, Kato (JP); Naoyuki Fujimoto, Kato (JP); Kiyoshi Chinzei, Ono (JP); Mieko Nakano, Kato (JP); Satoshi Fukui, Kato (JP); Atsushi Miki, Kato (JP); Shuji Kimura, Kato (JP); Mitsuhiro Gotoh, Kato (JP)

(73) Assignee: Fujitsu Limited, Kawasaki (JP)

( * ) Notice: Subject to any disclaimer, the term of this patent is extended or adjusted under 35 U.S.C. 154(b) by 1110 days.

(21) Appl. No.: 10/784,776

(22) Filed: Feb. 24, 2004

(65) Prior Publication Data
US 2004/0189829 A1 Sep. 30, 2004

(30) Foreign Application Priority Data

Mar. 25, 2003 (JP) ................................. 2003-083928

(51) Int. Cl.
*H04N 5/232* (2006.01)
(52) U.S. Cl. .................................. 348/211.99
(58) Field of Classification Search .............. 348/211.99
See application file for complete search history.

(56) References Cited

U.S. PATENT DOCUMENTS

| | | | |
|---|---|---|---|
| 5,742,141 A * | 4/1998 | Czekaj ........................... 318/587 |
| 6,281,806 B1 * | 8/2001 | Smith et al. ................... 340/901 |
| 6,366,221 B1 * | 4/2002 | Iisaka et al. ................. 340/932.2 |
| 6,768,417 B2 * | 7/2004 | Kuragaki et al. ........... 340/425.5 |
| 6,906,744 B1 * | 6/2005 | Hoshuyama et al. ....... 348/223.1 |
| 2001/0041618 A1 * | 11/2001 | Ouchi et al. ..................... 463/43 |
| 2002/0041239 A1 * | 4/2002 | Shimizu et al. ............. 340/932.2 |
| 2002/0130961 A1 * | 9/2002 | Lee et al. .................. 348/333.03 |
| 2002/0198634 A1 * | 12/2002 | Shimazaki et al. ............... 701/1 |
| 2003/0039380 A1 * | 2/2003 | Sukegawa et al. ............ 382/118 |
| 2003/0117516 A1 | 6/2003 | Ishida et al. |

FOREIGN PATENT DOCUMENTS

| | | |
|---|---|---|
| JP | 60-015780 A | 1/1985 |
| JP | 64-55674 | 3/1989 |
| JP | 5-268599 A | 10/1993 |
| JP | 6-268902 A | 9/1994 |

(Continued)

OTHER PUBLICATIONS

Notice of Rejection Grounds for the corresponding Japanese Patent Application No. 2003-083928 dated Jan. 31, 2006.

(Continued)

*Primary Examiner* — Usman Khan
(74) *Attorney, Agent, or Firm* — Westerman, Hattori, Daniels & Adrian, LLP

(57) ABSTRACT

An image shot by a shooting unit is stored in a shot image storing unit. An expected shooting state storing unit stores expected shooting state information which represents an expected shooting state of an object to be shot. A guide direction determining unit references the image stored in the shot image storing unit and the expected shooting state information, and determines in which direction the object to be shot, which is shot by the shooting unit, is to be guided. A guide direction instruction outputting unit notifies a user of a result of the determination made by the guide direction determining unit.

18 Claims, 28 Drawing Sheets

FOREIGN PATENT DOCUMENTS

| | | |
|---|---|---|
| JP | 10-137223 A | 5/1998 |
| JP | 11-196320 A | 7/1999 |
| JP | 2001-174881 A | 6/2001 |
| JP | 2001-229485 A | 8/2001 |
| JP | 2001-256496 A | 9/2001 |
| JP | 2001-273498 | 10/2001 |
| JP | 2002-158999 A | 5/2002 |
| JP | 2002-330318 A | 11/2002 |

OTHER PUBLICATIONS

Japanese Office Action dated May 12, 2009, issued in corresponding Japanese patent application No. 2006-102346.

Japanese Office Action dated May 12, 2009, issued in corresponding Japanese patent application No. 2006-207309.

* cited by examiner

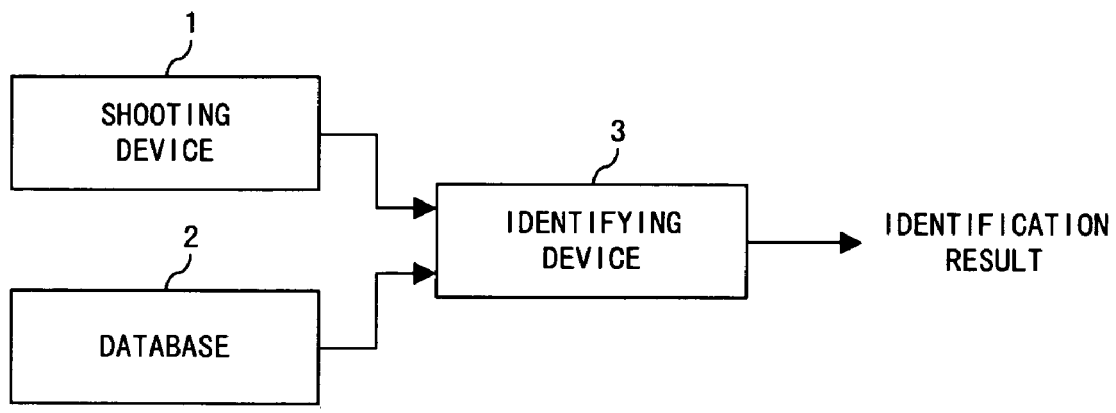
F I G. 1

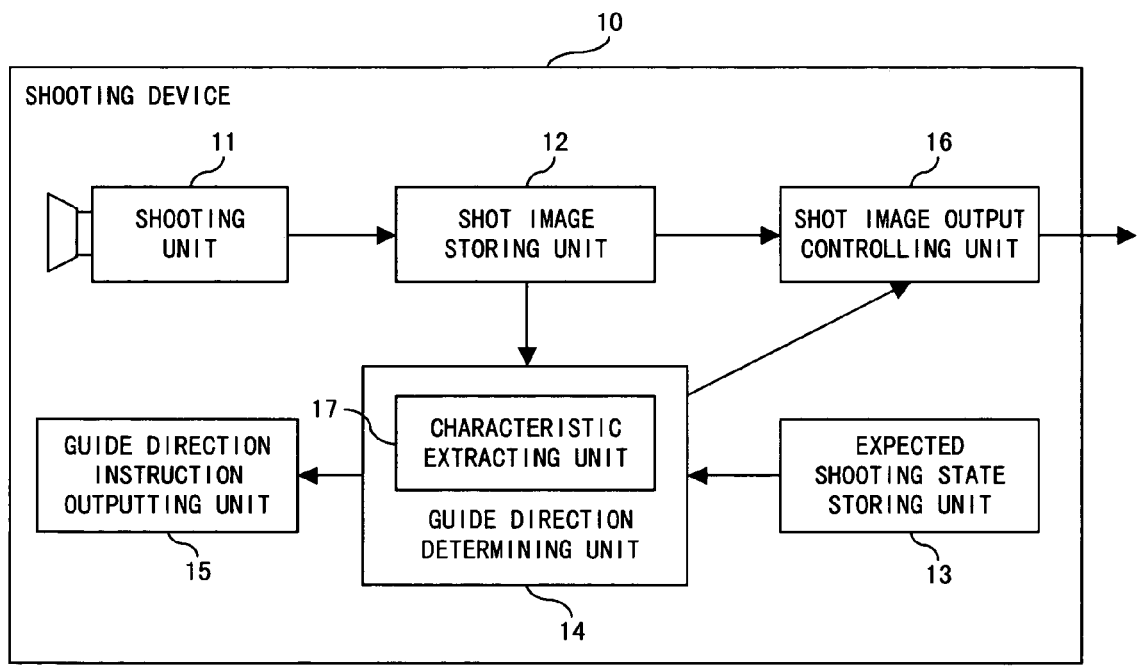
F I G. 2

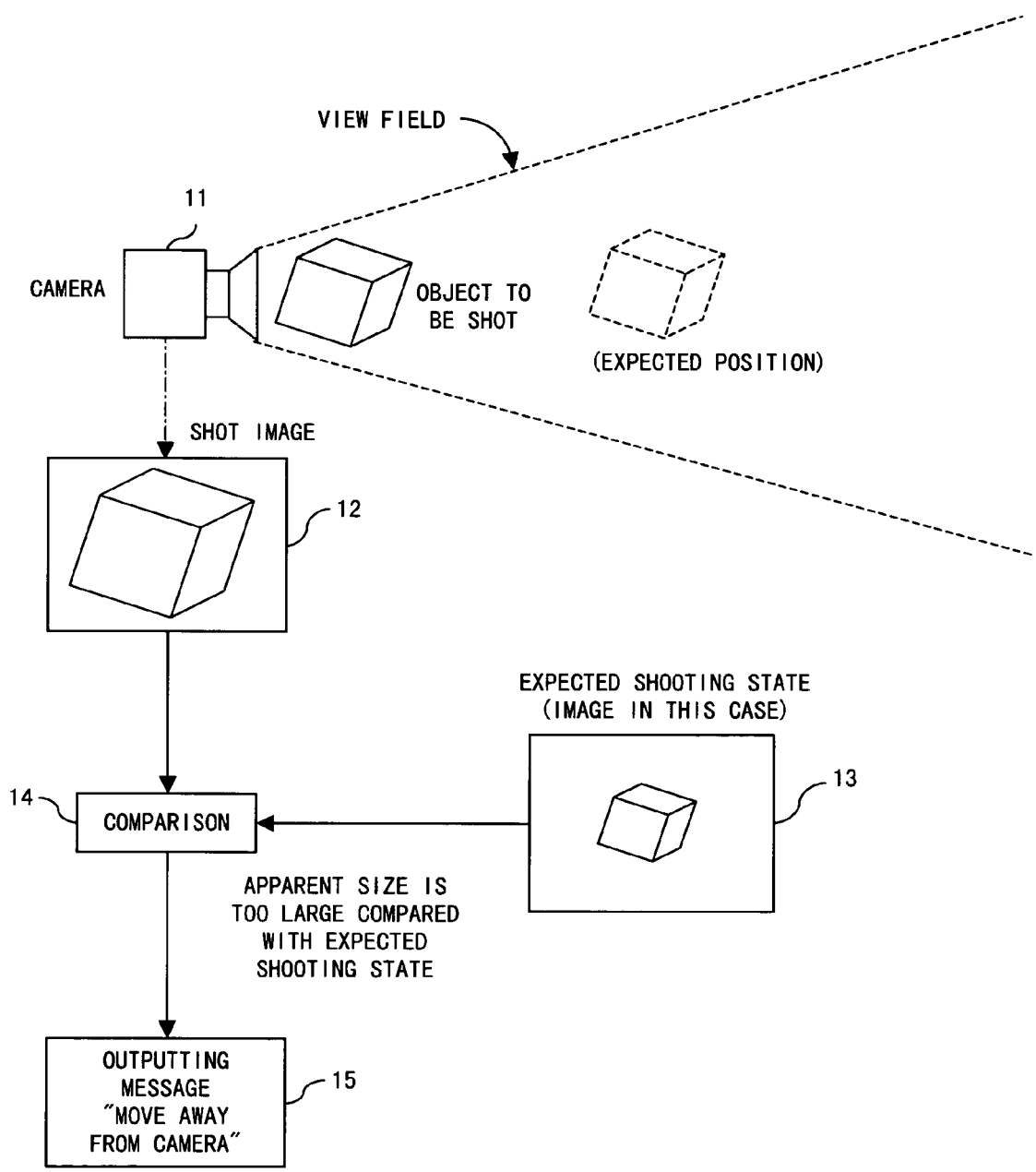
F I G. 4

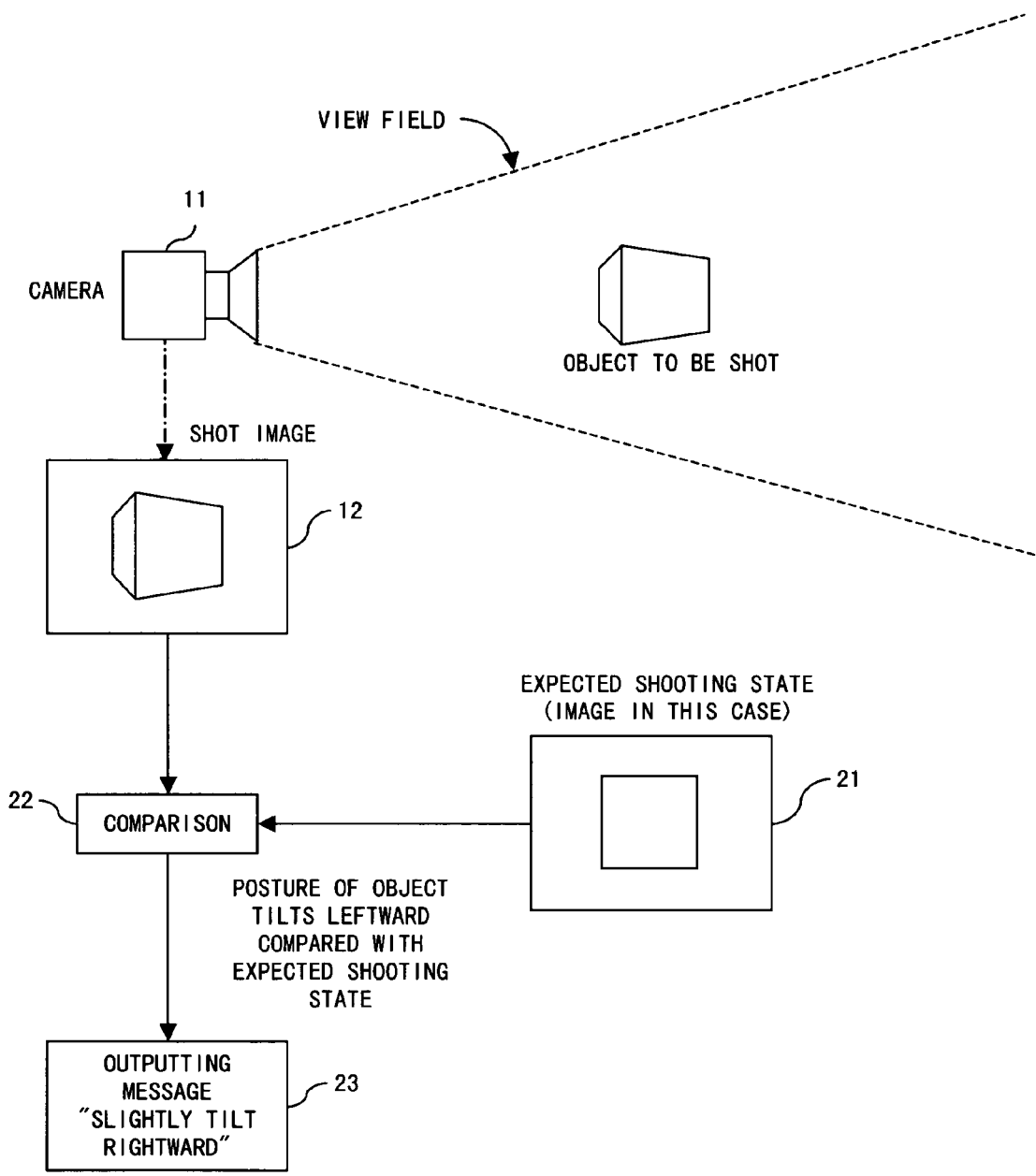
F I G. 8

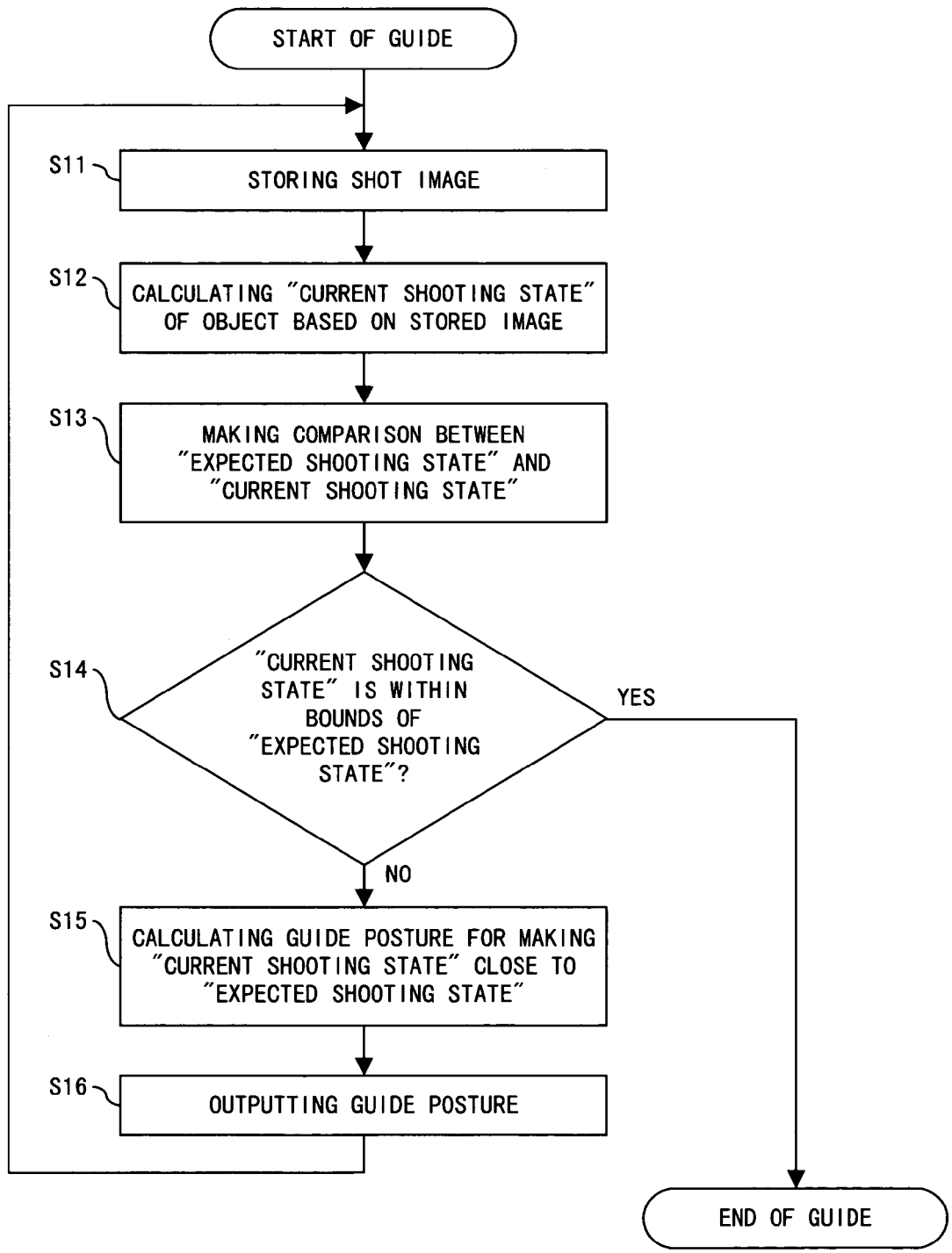
F I G. 10

(0%)

(8%)
IMAGE OF OBJECT TO BE SHOT (30%)
IMAGE OF OBJECT TO BE SHOT (80%)
IMAGE OF OBJECT TO BE SHOT

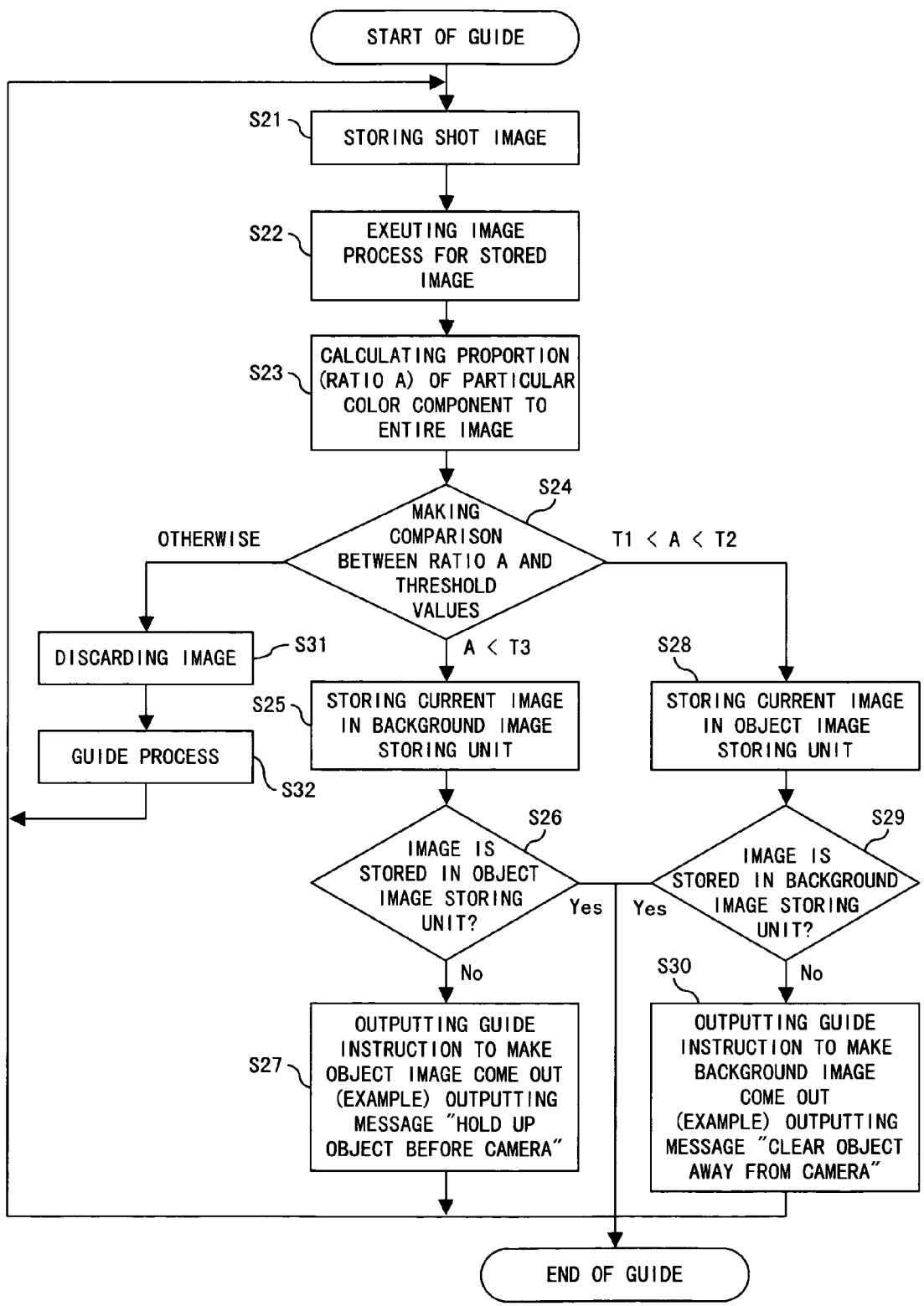
F I G. 1 5

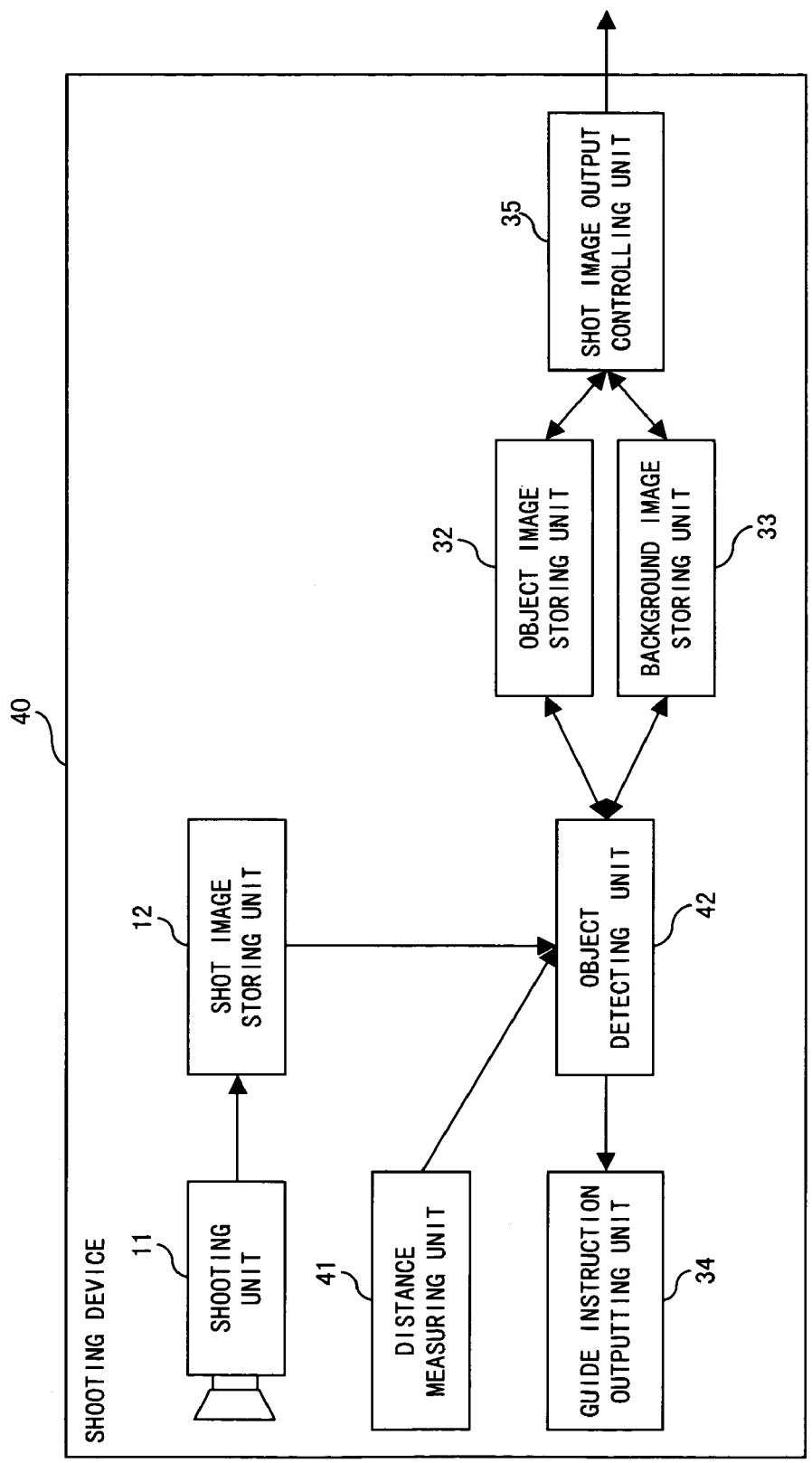
F I G. 16

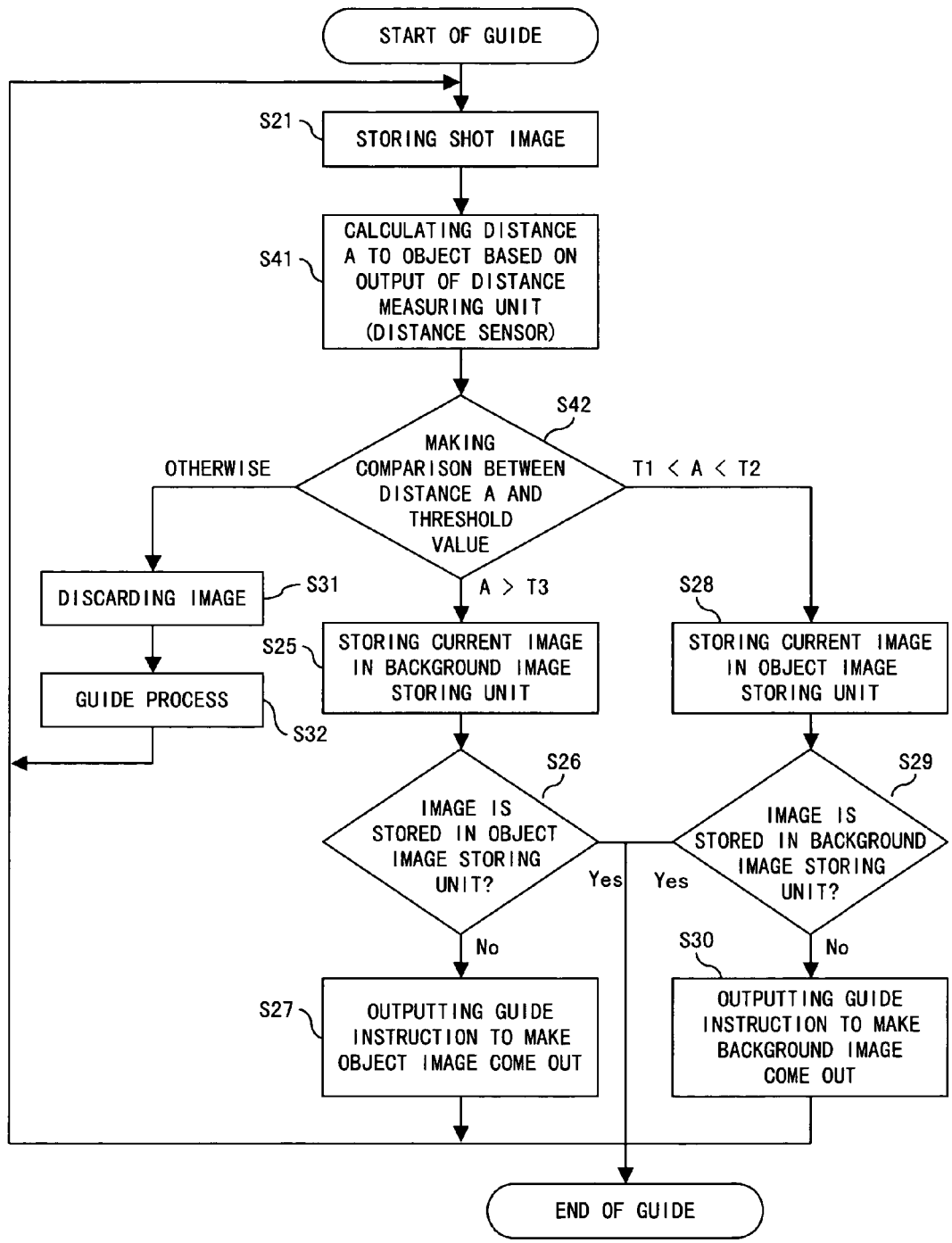
F I G. 1 7

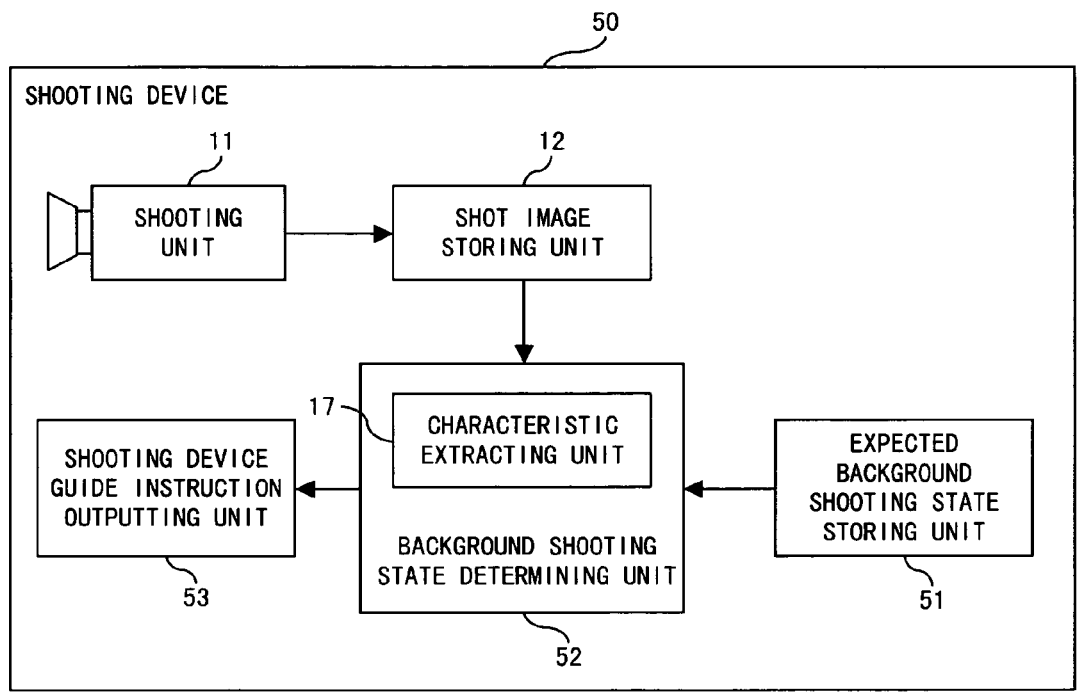
F I G. 18

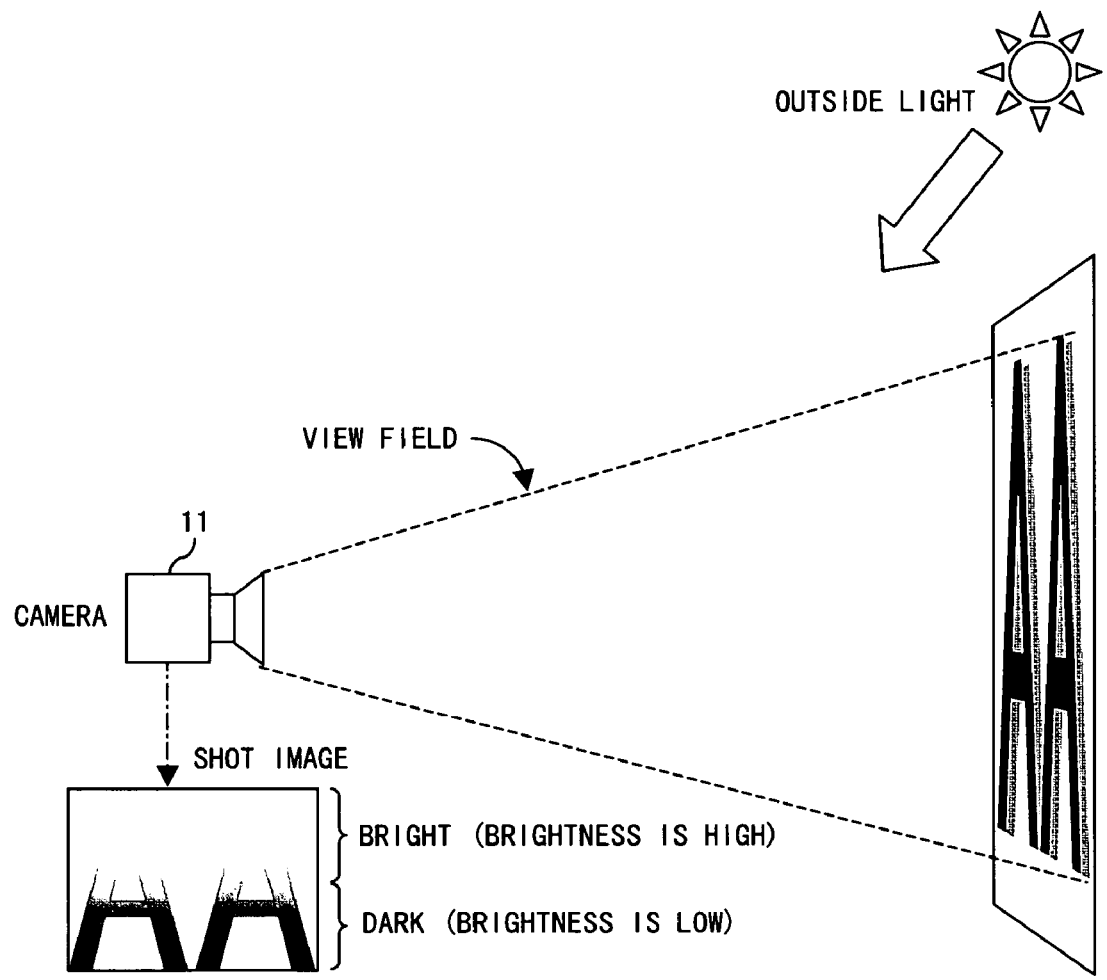
F I G. 19

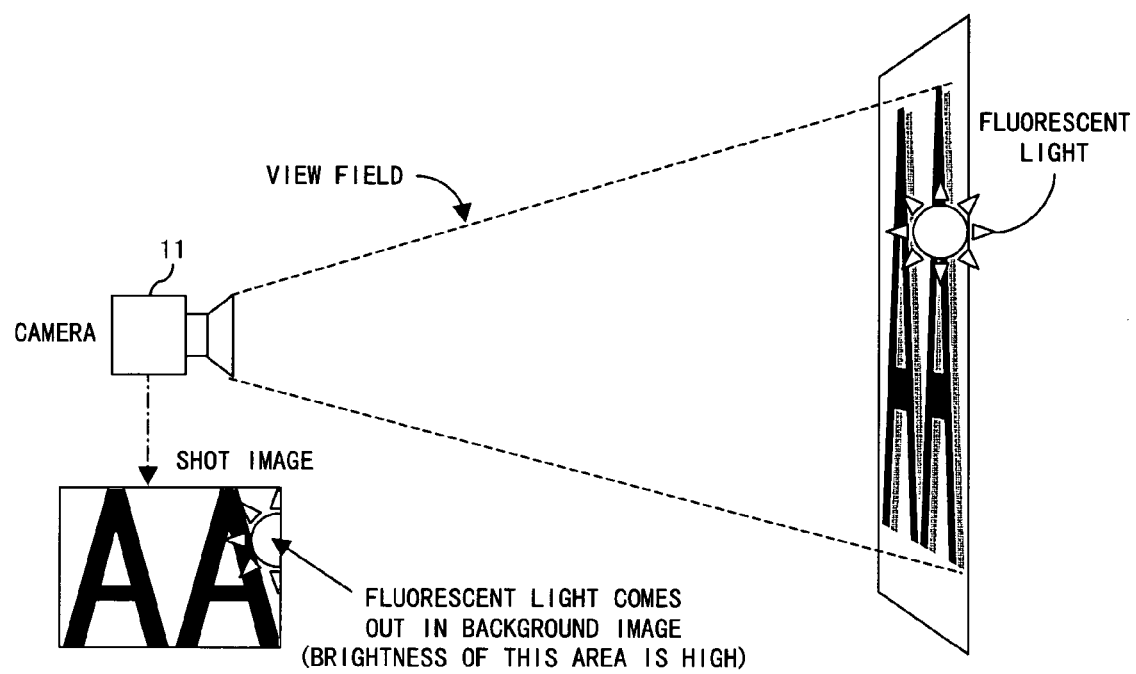
F I G. 2 0

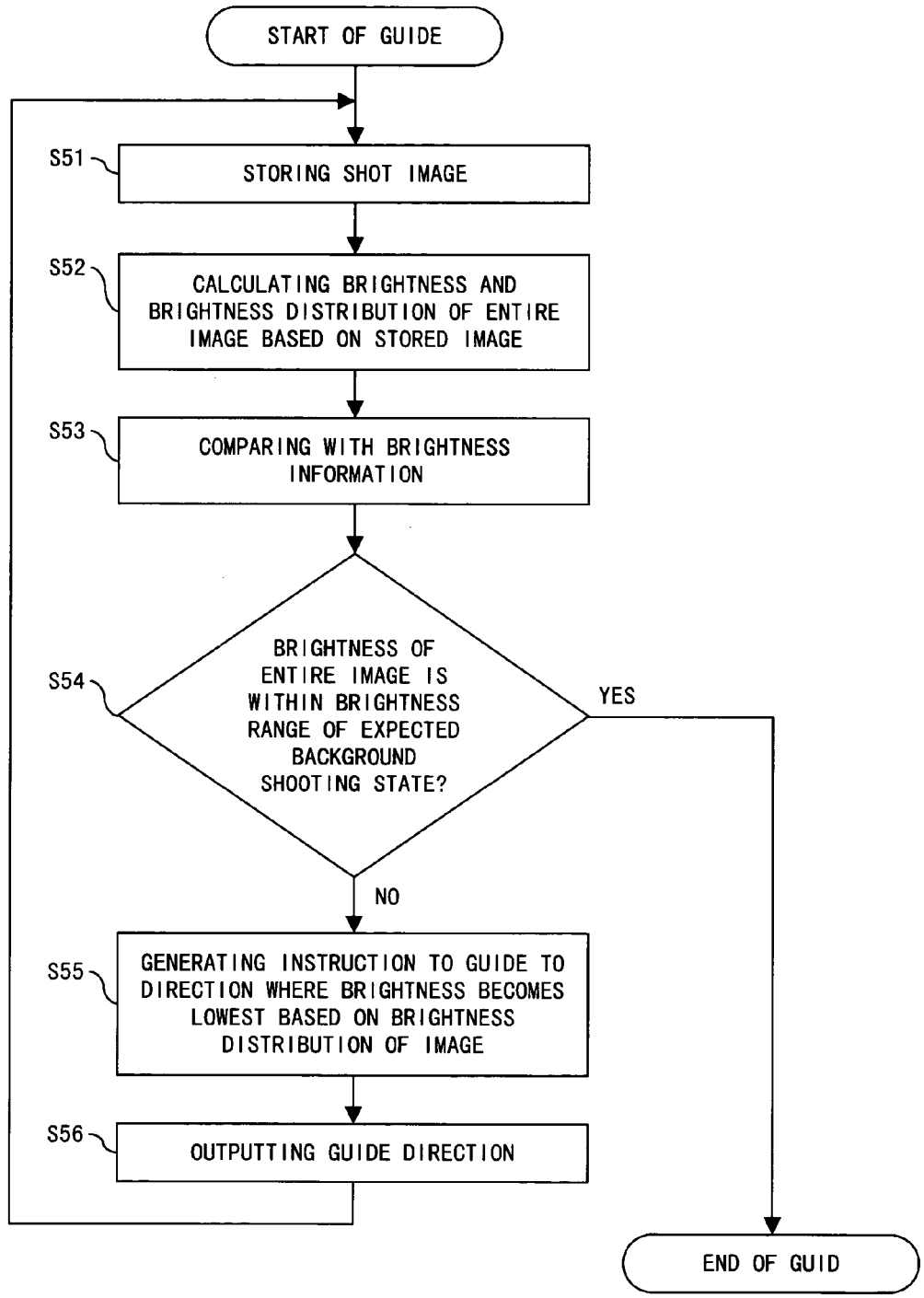
F I G. 21

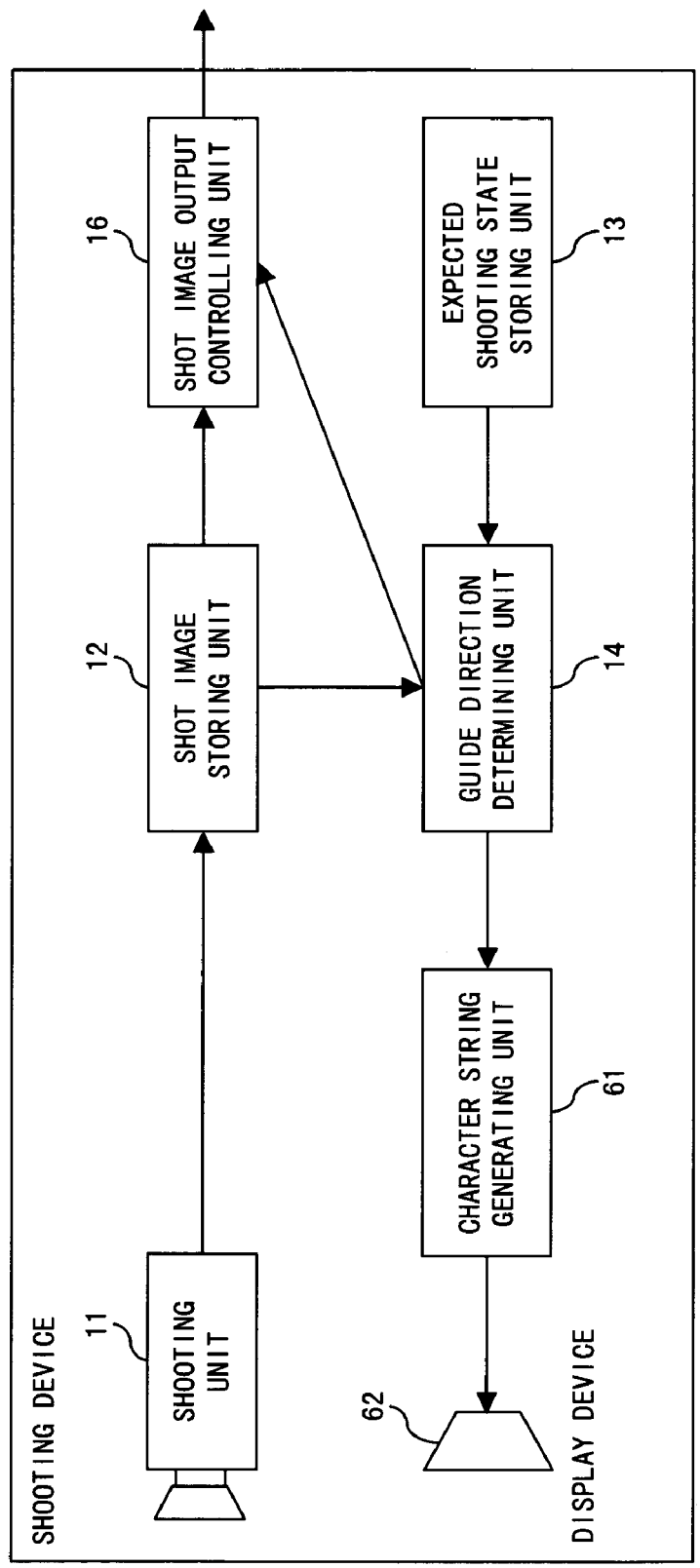
F I G. 22

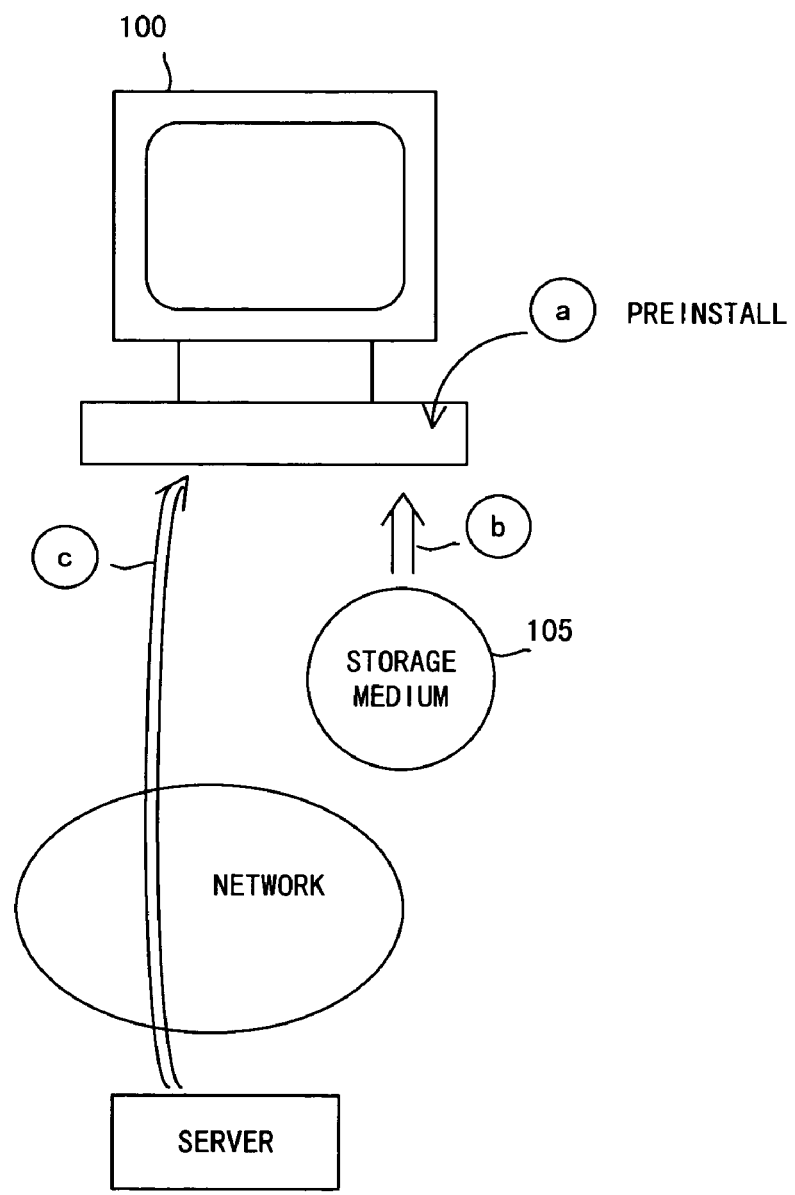
F I G. 2 8

SHOOTING DEVICE AND METHOD WITH FUNCTION FOR GUIDING AN OBJECT TO BE SHOT

BACKGROUND OF THE INVENTION

1. Field of the Invention

The present invention relates to a shooting device shooting an object, and more particularly, to a shooting device comprising a function for guiding an object to be shot to a suitable position or state.

2. Description of the Related Art

A technology for shooting an object with a shooting device, and for identifying the object with an image obtained by the shooting is known (for example, see Patent Document 1).

A system recited in Patent Document 1 comprises a camera, and a display device displaying an image shot with the camera. On the display device, the image of a shooting target object shot by the camera, and an outline (reference outline) of the image, which can be possibly obtained if the shooting target object is shot in a state of being arranged in a suitable position are overlaid and displayed. As a result, a user can modify the position of the shooting target object, and can obtain the image of the shooting target object in the state where the object is arranged in the suitable position.

Also a technology for guiding an object to a predetermined position based on the image of the object which is obtained with a camera is known (for example, see Patent Document 2).

However, a system recited in Patent Document 2 is provided in a parking lot, etc., and intended to guide an automobile to a destination along a predetermined path by using the display of a message, the blink of a lamp, etc. when the automobile is detected from a shot image. Namely, this system is not intended to guide an object to be shot to a position in which optimum shooting can be made.

[Patent Document 1]
Japanese Patent Publication No. 2001-273498 (see FIGS. 12 through 14, and paragraphs 0070 through 0073)

[Patent Document 2]
Japanese Patent Publication No. SHOWA64-55674 (see page 2)

With the method recited in Patent Document 1, a user modifies the position of a shooting target object while viewing the reference outline displayed on the display device. Namely, the display device for displaying the reference outline and a shot image is a prerequisite to this method.

Furthermore, with this method, although a user can move a shooting target object to a suitable position for shooting, he or she cannot verify whether or not the object is in a posture suitable for the shooting. Here, the "posture" is a concept including the angle or the tilt of the object relative to the camera.

SUMMARY OF THE INVENTION

An object of the present invention is to improve identification accuracy when an object is identified using an image obtained by shooting the object with a shooting device. Another object of the present invention is to guide an object to be shot to a suitable position or posture.

A shooting device according to the present invention comprises a shooting unit shooting an object, an expected shooting state storing unit storing expected shooting state information which represents an expected shooting state of the object, a guide determining unit determining how the object is to be guided based on the expected shooting state information and an image shot by the shooting unit, a guide instruction outputting unit instructing how the object is to be guided based on a result of the determination made by the guide determining unit, and an image outputting unit outputting the image shot by the shooting unit.

In this shooting device, how an object is to be guided is determined by making a comparison between the state of an image actually shot and an expected shooting state. Then, an instruction of how the object is to be guided is output based on a result of the determination. Accordingly, if the object is moved or rotated in accordance with the guide instruction, the state of the object can be made close to the expected shooting state. As a result, a satisfactory image according to purpose can be obtained.

In the above described shooting device, the expected position of the object may be defined as expected shooting state information, and the guide determining unit may determine a direction where the object is to be guided. In this case, the object is guided to the expected position and shot, whereby a satisfactory image can be obtained.

Additionally, in the above described shooting device, an expected posture of the object may be defined as expected shooting state information, and the guide determining unit may determine a rotation direction where the object is to be guided. In this case, the object is guided to the expected posture and shot, whereby a satisfactory image can be obtained.

A shooting device according to another aspect of the present invention comprises a shooting unit, an expected shooting state storing unit storing expected shooting state information which represents an expected shooting state in the case where a background image is shot with the shooting unit, a guide determining unit determining a direction or an angle, in or at which the shooting unit is to be guided, based on the expected shooting state information and the image shot by the shooting unit, and a guide instruction outputting unit instructing a direction or an angle, in or at which the shooting unit is to be guided, based on a result of the determination made by the guide determining unit.

In this shooting device, the position or the angle of the shooting unit is optimized, whereby a satisfactory background image can be obtained, and an image of an object to be shot can be accurately extracted from a shot image.

BRIEF DESCRIPTION OF THE DRAWINGS

FIG. 1 is a schematic showing the configuration of one example of a system where a shooting device according to the present invention is used;

FIG. 2 is a block diagram showing the configuration of a shooting device according to a first embodiment;

FIGS. 3 through 5 explain the operations of the shooting device according to the first embodiment;

FIGS. 8, 9A and 9B explain the operations of the shooting device according to the second embodiment;

FIG. 10 is a flowchart showing the operations of the shooting device according to the second embodiment;

FIG. 15 is a flowchart showing the operations of the shooting device according to the third embodiment;

FIG. 16 is a block diagram showing the configuration of a shooting device according to a fourth embodiment;

FIG. 17 is a flowchart showing the operations of the shooting device according to the fourth embodiment;

FIG. 18 is a block diagram showing the configuration of a shooting device according to a fifth embodiment;

FIGS. 19 and 20 explain the operations of the shooting device according to the fifth embodiment;

FIG. 21 is a flowchart showing the operations of the shooting device according to the fifth embodiment;

FIGS. 22 through 25 explain methods outputting a guide instruction;

FIG. 28 explains a method providing a software program according to the present invention.

DESCRIPTION OF THE PREFERRED EMBODIMENTS

Figure 3:
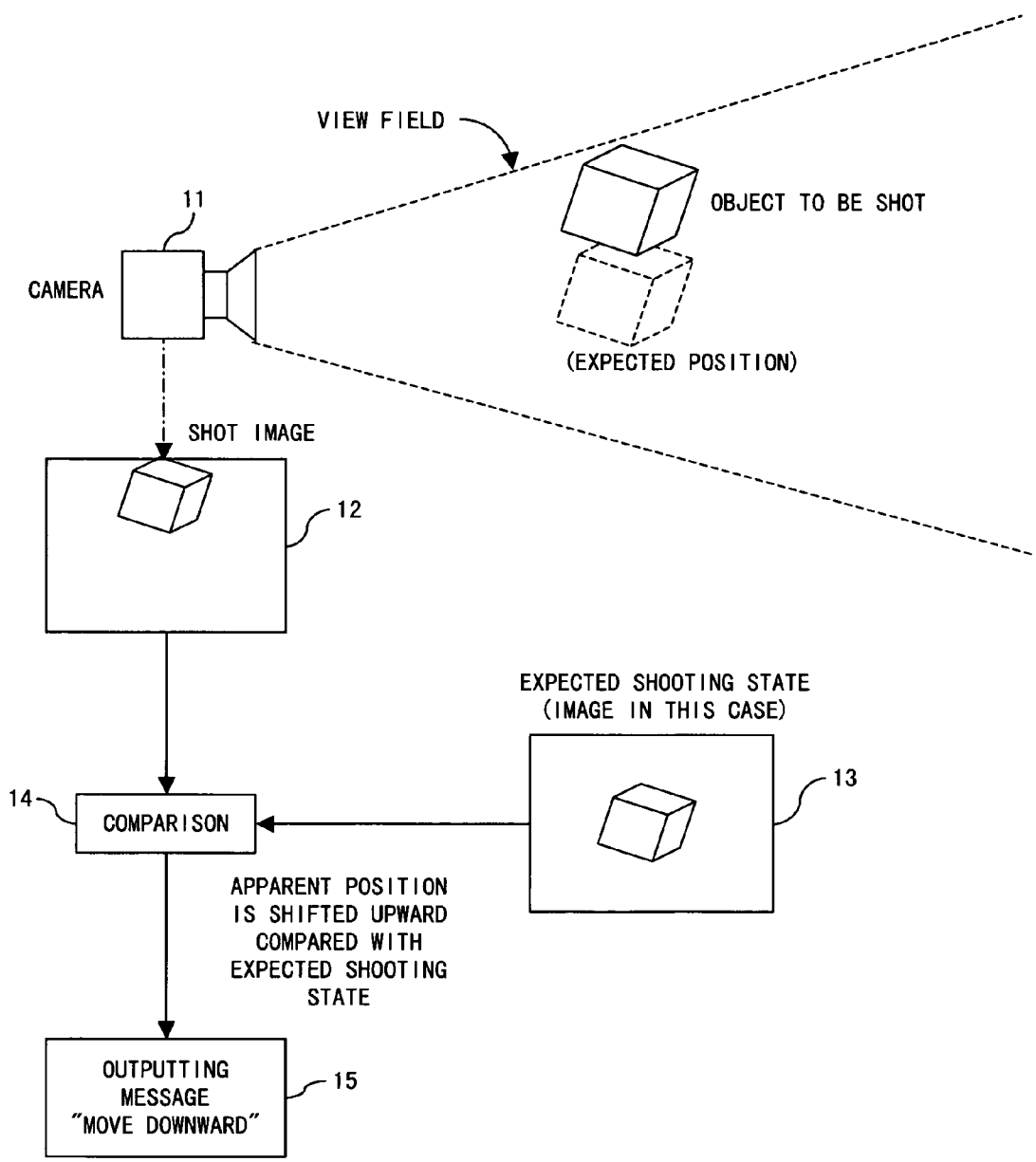

FIG. 1 is a schematic showing the configuration of one implementation example of a system where a shooting device according to the present invention is used. This system comprises a shooting device 1 which shoots an object, a database 2 to which image data of one or a plurality of objects are registered, and an identifying device 3 which identifies the object shot by the shooting device 1 (or determining whether or not the object shot by the shooting device 1 is registered to the database 2) by comparing the image shot with the shooting device 1 and each of the images registered in the database 2.

To improve identification accuracy in this system, an object must be arranged in a suitable position and with a suitable posture when the object is shot. Accordingly, the shooting device according to the present invention comprises a function for guiding an object to be shot to a suitable position and suitable posture. Therefore, a user of this system can move or rotate an object to be shot in accordance with the guidance. Note that the "posture of an object" is a concept including the angle or the tilt of the object relative to the camera.

FIG. 2 is a block diagram showing the configuration of a shooting device according to a first embodiment. The shooting device 10 according to the first embodiment comprises a shooting unit 11, a shot image storing unit 12, an expected shooting state storing unit 13, a guide direction determining unit 14, a guide direction instruction outputting unit 15, and a shot image output controlling unit 16.

The shooting unit 11 is, for example, a camera, and outputs image data of a shot image. This image data is, for example, digital data in a bitmap format, although this is not particularly limited. The shot image storing unit 12 stores the image data output from the shooting unit 11.

The expected shooting state storing unit 13 stores expected shooting state information which represents an expected shooting state of an object to be shot. Here, the expected shooting state information includes information that represents an expected position in which an object to be shot is to be arranged at the time of shooting. The expected position is a position in which the characteristic of an object to be shot can be fully detected if the object is shot in the state of being arranged in that position. In this case, the expected shooting state information may be image data that is obtained beforehand by shooting an object to be shot or an object equivalent thereto in the state where the object is arranged in an expected position.

The guide direction determining unit 14 references the expected shooting state information, determines whether or not the object to be shot, which is shot by the shooting unit 11, is arranged in a suitable position, and also determines in which direction the object to be shot is to be guided if the object is not arranged in the suitable position. Note that the guide direction determining unit 14 comprises a characteristic extracting unit 17 which analyzes image data stored in the shot image storing unit 12 and extracts its characteristic, and the guide direction determining unit 14 can detect or extract the object to be shot based on the output of the characteristic extracting unit 17.

The guide direction instruction outputting unit 15 notifies a user of a result of the determination made by the guide direction determining unit 14. Namely, if an object to be shot is arranged in a suitable position, the guide direction instruction outputting unit 15 notifies the user that the object is arranged in the suitable position. Or, if the object to be shot is not arranged in a suitable position, the guide direction instruction outputting unit 15 presents to the user a direction where the object to be shot is to be moved. As a result, the user can arrange the object to be shot in the position suitable for shooting.

The shot image output controlling unit 16 outputs image data stored in the shot image storing unit 12. Here, this image data is transmitted, for example, to the identifying device 3 shown in FIG. 1. The shot image output controlling unit 16 may output the image data stored in the shot image storing unit 12 only if the object to be shot is determined to be arranged in the suitable position by the guide direction determining unit 14. Namely, if the object to be shot is determined to be arranged in the suitable position, an image shot in that state is expected to be an image which is fully satisfactory to identify the object to be shot. Therefore, transmitting its image data to the identifying device 3 only in that case can improve the identification accuracy.

Operations of the shooting device 10 according to the first embodiment are described next with reference to FIGS. 3 through 5. Here, assume that an expected image, which is obtained by shooting an object to be shot or an object equivalent thereto in the state where the object is arranged in an expected position, is prestored in the expected shooting state storing unit 13 as expected shooting state information.

In the example shown in FIG. 3, the object to be shot is arranged in a position shifted upward from the expected position. First, a shot image obtained by the shooting unit 11 is stored in the shot image storing unit 12. Then, the guide direction determining unit 14 makes a comparison between the shot image stored in the shot image storing unit 12 and the expected image registered to the expected shooting state storing unit 13 as expected shooting state information. In this case, it is detected that the object to be shot is arranged in the position shifted upward from the expected position. Then, the guide direction instruction outputting unit 15 outputs the result of the detection made by the guide direction determining unit 14. Specifically, for example, a message "move the object downward" is output.

In the example shown in FIG. 4, the object to be shot is too close to the shooting unit 11. In this case, if a comparison is made between the shot image stored in the shot image storing unit 12 and the expected image registered to the expected shooting state storing unit 13, it is detected that the object to be shot, which comes out in the shot image, is larger than the object to be shot, which comes out in the expected image. As a result, the guide direction determining unit 14 detects that the object to be shot is too close to the shooting unit 11. Then, the guide direction instruction outputting unit 15 outputs the result of the detection made by the guide direction determining unit 14. Specifically, for example, a message "move the object away from camera" is output.

Figure 5:
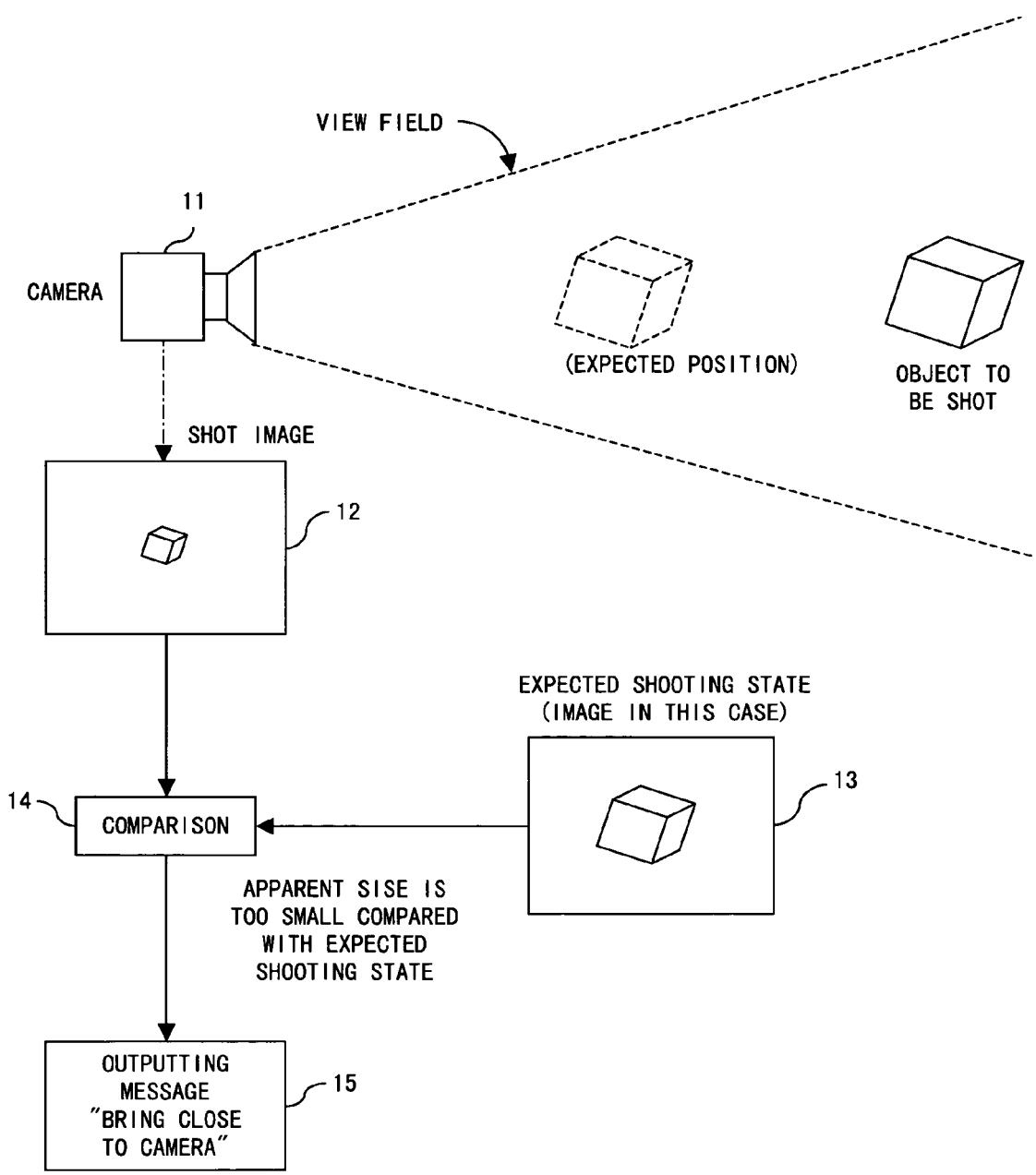

In the example shown in FIG. 5, the object to be shot is too apart from the shooting unit 11. If a comparison is made between the shot image stored in the shot image storing unit 12 and the expected image registered to the expected shooting state storing unit 13, it is detected that the object to be shot, which comes out in the shot image, is smaller than the object to be shot, which comes out in the expected image. As a result, the guide direction determining unit 14 detects that the object to be shot is too apart from the shooting unit 11. Then, the guide direction instruction outputting unit 15 outputs the result of the detection made by the guide direction determining unit 14. Specifically, for example, a message "bring the object close to camera" is output.

As described above, the shooting device 10 according to the first embodiment outputs a message which guides an object to be shot to an expected position if the object to be shot is arranged in a position shifted from the expected position. In accordance with this message, a user can easily move the object to be shot to the expected position. Consequently, an image of the object which is shot in a suitable state can be obtained, thereby improving the identification accuracy of the object.

Figure 6:
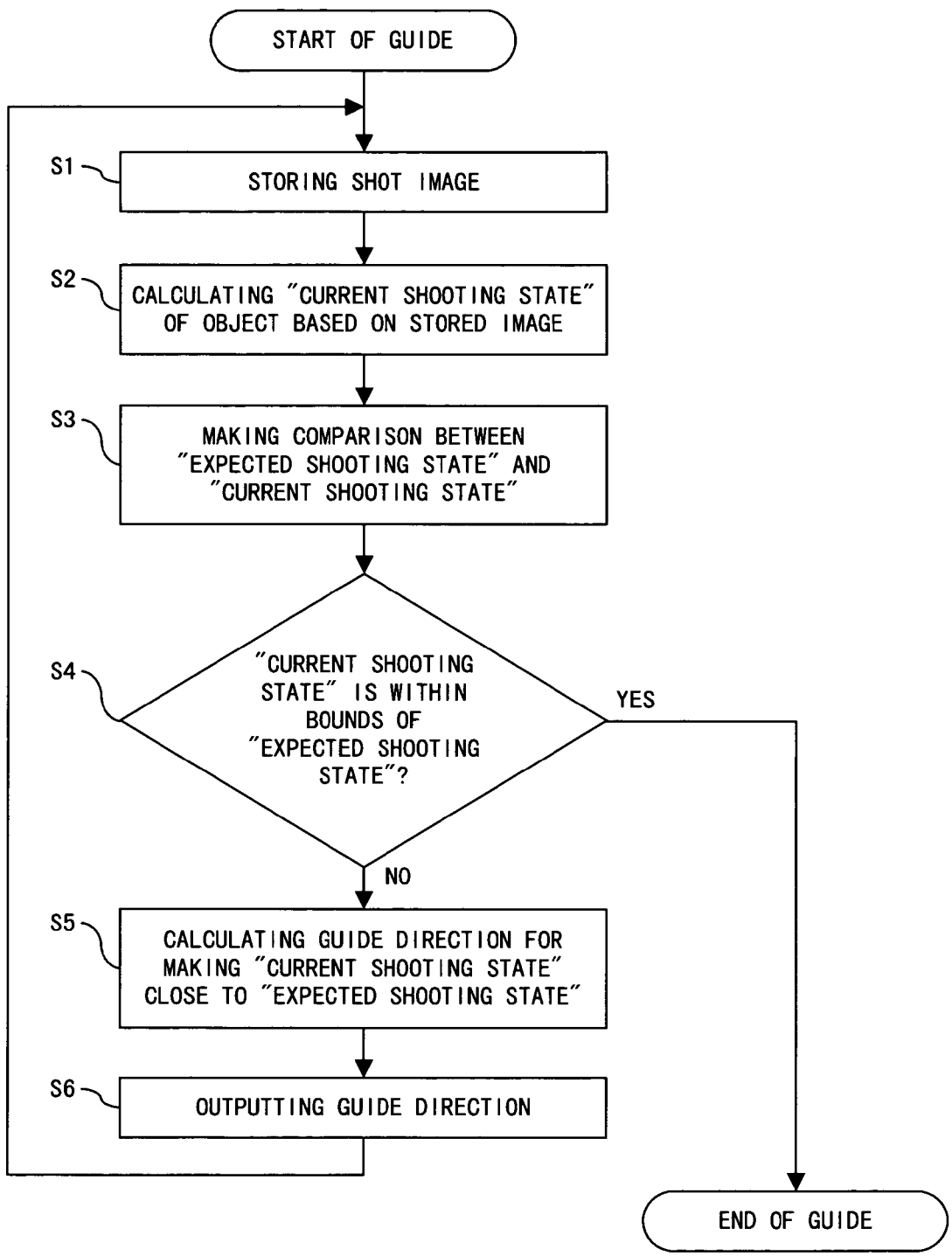
FIG. 6 is a flowchart showing the operations of the shooting device according to the first embodiment.

FIG. 6 is a flowchart showing the operations of the shooting device 10 according to the first embodiment. Assume that expected shooting state information is preregistered to the expected shooting state storing unit 13.

In step S1, the shooting unit 11 makes shooting. Then, an image shot by the shooting unit 11 is stored in the shot image storing unit 12. In step S2, the image stored in the shot image storing unit 12 is analyzed, whereby "current shooting state" is calculated. The "shooting state" means the position of the object to be shot in the examples shown in FIGS. 3 through 5.

In steps S3 and S4, a comparison is made between the "current shooting state" obtained in step S2, and the "expected shooting state" stored in the expected shooting state storing unit 13. In the examples shown in FIGS. 3 through 5, the position, the size, etc. of the object to be shot within the image are compared. If the "current shooting state" is within the bounds of the "expected shooting state", the object to be shot is recognized to be arranged in an expected position, and the guidance process is terminated. Or, if the "current shooting state" is not within the bounds of the "expected shooting state", the object to be shot is recognized not to be arranged in the expected position, and a guidance process in steps S5 and S6 is executed.

In step S5, a direction where the object to be shot is to be guided is determined. Here, the guide direction is calculated as a direction where the "current shooting state" is made close to the "expected shooting state". Its specific examples are as described above with reference to FIGS. 3 through 5. Then, in step S6, a message for notifying a user of the guide direction is output. In accordance with this message, the user can make the object to be shot close to the expected position. Hereafter, the flow goes back to step S1, and the next image is shot.

The process of this flowchart is repeatedly executed until the object to be shot is arranged in the expected position. When the object to be shot is arranged in the expected position, the guidance process is terminated.

Figure 7:
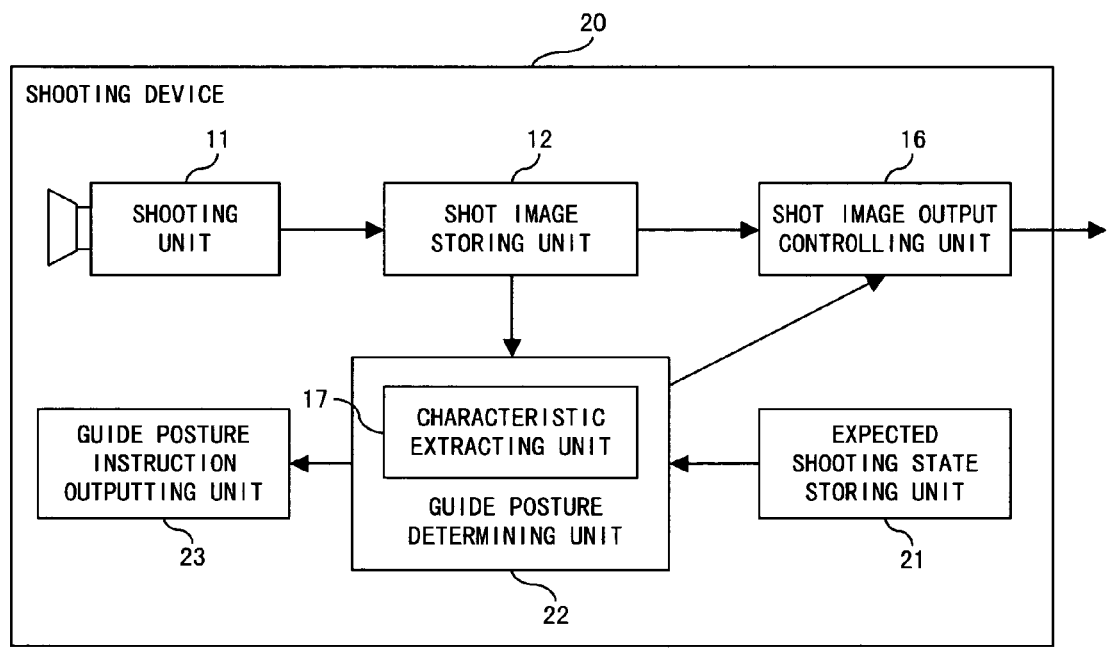
FIG. 7 is a block diagram showing the configuration of a shooting device according to a second embodiment.

FIG. 7 is a block diagram showing the configuration of a shooting device according to a second embodiment. The shooting device 20 according to the second embodiment comprises a shooting unit 11, a shot image storing unit 12, an expected shooting state storing unit 21, a guide posture determining unit 22, a guide posture instruction outputting unit 23, and a shot image output controlling unit 16. The shooting unit 11, the shot image storing unit 12, and the shot image output controlling unit 16 are the same as those described in the first embodiment.

The expected shooting state storing unit 21 stores expected shooting state information which represents an expected shooting state of an object to be shot. Here, the expected shooting state information includes information which represents an expected posture of the object to be shot at the time of shooting. The expected posture is a posture in which the characteristic of an object to be shot can be fully detected if the object is shot in this posture. In this case, the expected shooting state information may be image data which is obtained beforehand by shooting the object to be shot or an object equivalent thereto in a state where the object is made to take an expected posture.

The guide posture determining unit 22 references the expected shooting state information, determines whether or not the object to be shot, which is shot by the shooting unit 11, is in a suitable posture, and also determines how the object to be shot is rotated if the object is not in a suitable posture. Note that the guide posture determining unit 22 comprises a characteristic extracting unit 17 which analyzes image data stored in the shot image storing unit 12 and extracts its characteristic, and the guide posture determining unit 22 can recognize or detect the posture of the object to be shot based on the output of the characteristic extracting unit 17.

The guide posture instruction outputting unit 23 notifies a user of the result of the determination made by the guide posture determining unit 22. Namely, if the object to be shot is in a suitable posture, the guide posture instruction outputting unit 23 notifies the user that the object to be shot is in the suitable posture. Or, if the object to be shot is not in the suitable posture, the guide posture instruction outputting unit 23 presents to the user a direction where the object to be shot is to be rotated, and its rotation amount. As a result, the user can modify the object to be shot to the posture suitable for shooting.

Operations of the shooting device 20 according to the second embodiment are described next with reference to FIGS. 8, 9A and 9B.

In the example shown in FIG. 8, it is assumed that the shape of an object to be shot is a cube. It is also assumed that an expected image, which is obtained by shooting the object to be shot or an object equivalent thereto in the state where the object is made to take an expected posture, is prestored in the expected shooting state storing unit 21 as expected shooting state information. In this example, a state where one side of the cube is oriented toward the camera is the expected posture. Accordingly, the shape of the object which comes out in the expected image is a square.

In this example, the posture of the object to be shot tilts leftward. In this case, if a comparison is made between the shot image stored in the shot image storing unit 12 and the expected image registered to the expected shooting state storing unit 21, the shape of the object, which comes out in the expected image, is the square, whereas that of the object to be shot, which comes out in the shot image, is not a square. At this time, the guide posture determining unit 22 analyzes the shape of the object to be shot which comes out in the shot image, whereby the tilt angle of the object to be shot can be recognized. Namely, the guide posture determining unit 22 detects that the object to be shot tilts leftward, and also detects its tilt angle. Then, the guide posture instruction outputting unit 23 outputs the result of the detection made by the guide posture determining unit 22. Specifically, for example, a message "slightly tilt the object rightward" is output.

Figure 9A:
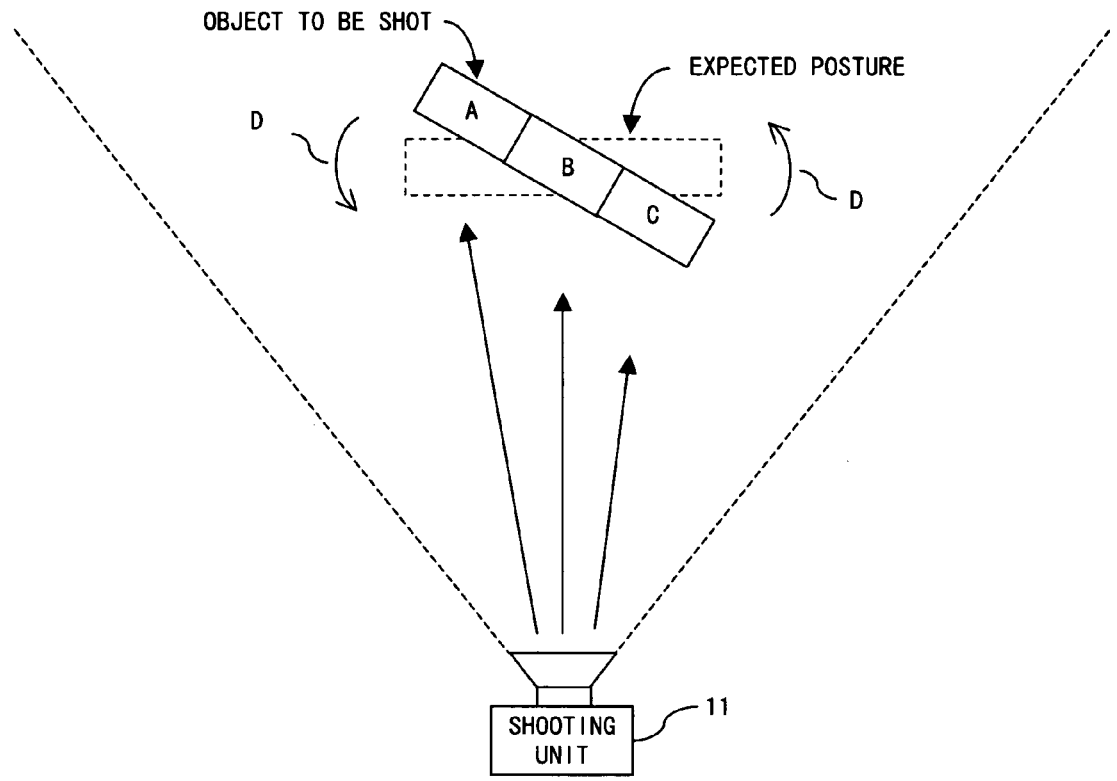
Figure 9B:
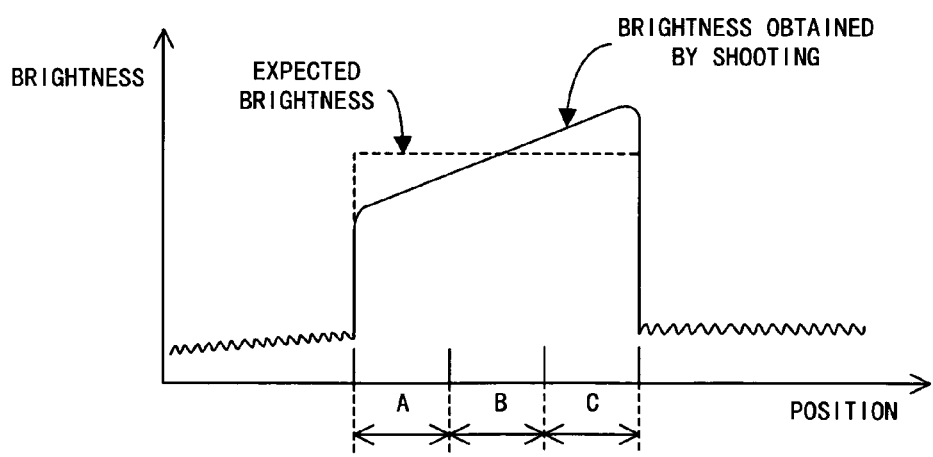

In the example shown in FIGS. 9A and 9B, it is assumed that the shape of an object to be shot is a plate. It is also assumed that the shooting unit 11 emits even irradiation light in a direction where shooting is to be made as shown in FIG. 9A. It is further assumed that expected brightness distribution information is stored in the expected shooting state storing unit 21 as expected shooting state information. Here, the expected brightness distribution indicates a brightness distribution of an image that is obtained by shooting an object to be shot or an object equivalent thereto in a state where the object is made to take an expected posture. In this example, the expected posture of the object to be shot is assumed to be a state where illumination light vertically impinges on a predetermined side of the object to be shot the shape of which is the plate, as indicated by a broken line in FIG. 9A. Therefore, the expected brightness distribution is information which represents that brightness is even on the whole area of the object to be shot, as indicated by a broken line in FIG. 9B.

In this example, the object to be shot tilts relative to the expected posture as shown in FIG. 9A. Specifically, a distance from the shooting unit 11 to an area C is shorter than that from the shooting unit 11 to an area A. If the object to be shot is shot in this state, brightness of the area C is higher than that of the area A, as shown in FIG. 9B. Accordingly, the posture (tilt in this case) of the object to be shot can be detected by making a contrast between the brightness distribution obtained by this shooting and the expected brightness distribution. Hereafter, the guide posture instruction outputting unit 23 outputs the result of the detection made by the guide posture determining unit 22 in a similar manner as in the example shown in FIG. 8. Specifically, a guide instruction to rotate the object to be shot in a direction indicated by an arrow D in FIG. 9A is output.

In FIG. 9, the tilt of the object to be shot is detected based on the one-dimensional brightness distribution for ease of explanation. However, the tilt of the object to be shot may be detected based on a two-dimensional brightness distribution.

FIG. 10 is a flowchart showing the operations of the shooting device 20 according to the second embodiment. Here, processes in steps S11 to S14 are fundamentally the same as those in steps S1 to S4 shown in FIG. 6. However, expected posture information which represents the expected posture of an object to be shot is stored in the expected shooting state storing unit 21. Then, it is determined in step S13 and S14 whether or not the posture of the object to be shot is within the bounds of the expected shooting state.

If the posture of the object to be shot is out of bounds of the expected shooting state, a direction where the object to be shot is rotated, and its rotation amount are calculated in step S15. Here, the rotation direction and the rotation amount are calculated so that the "current shooting state" is made close to the "expected shooting state". Its specific examples are already described with reference to FIGS. 8 and 9. Then, in step S16, a message for notifying the rotation direction and the rotation amount is output to a user. Accordingly, the user can make the posture of the object to be shot close to the expected posture. Hereafter, the flow goes back to step S11, and the next image is shot.

The process of this flowchart is repeatedly executed until the posture of the object to be shot takes the expected posture. When the posture of the object to be shot takes the expected posture, the guidance process is terminated.

In the above described first and second embodiments, the position or the posture of an object to be shot is detected, and whether guiding the object to be shot is needed is determined based on a result of the detection. However, the guidance process may be executed in consideration of another factor.

For example, a system shooting an object with a camera, and identifying the object with a pattern detected by analyzing the shot image is considered. Namely, the object to be identified is assumed to possess the pattern which can be detected by analyzing the shot image. In this case, the characteristic extracting unit 17 shown in FIG. 2 or 7 detects the pattern possessed by the object to be shot by analyzing the image obtained by the shooting unit 11. In the meantime, in the expected shooting state storing unit 13 or 21, an expected amount of pattern elements detected from a shot image obtained by the shooting unit 11 is defined as expected shooting state information. Here, the "amount of pattern elements" is, for example, "the number of lines" or "the total length of lines", if the pattern is a line pattern.

The guide direction determining unit 14 or the guide posture determining unit 22 makes a comparison between the amount of the pattern elements detected by the characteristic extracting unit 17 and the expected amount of the pattern elements defined as the expected shooting state information. The guidance process may be continued if the amount of the detected pattern elements is smaller, and may be terminated when the amount of the detected pattern elements becomes larger.

Figure 11:
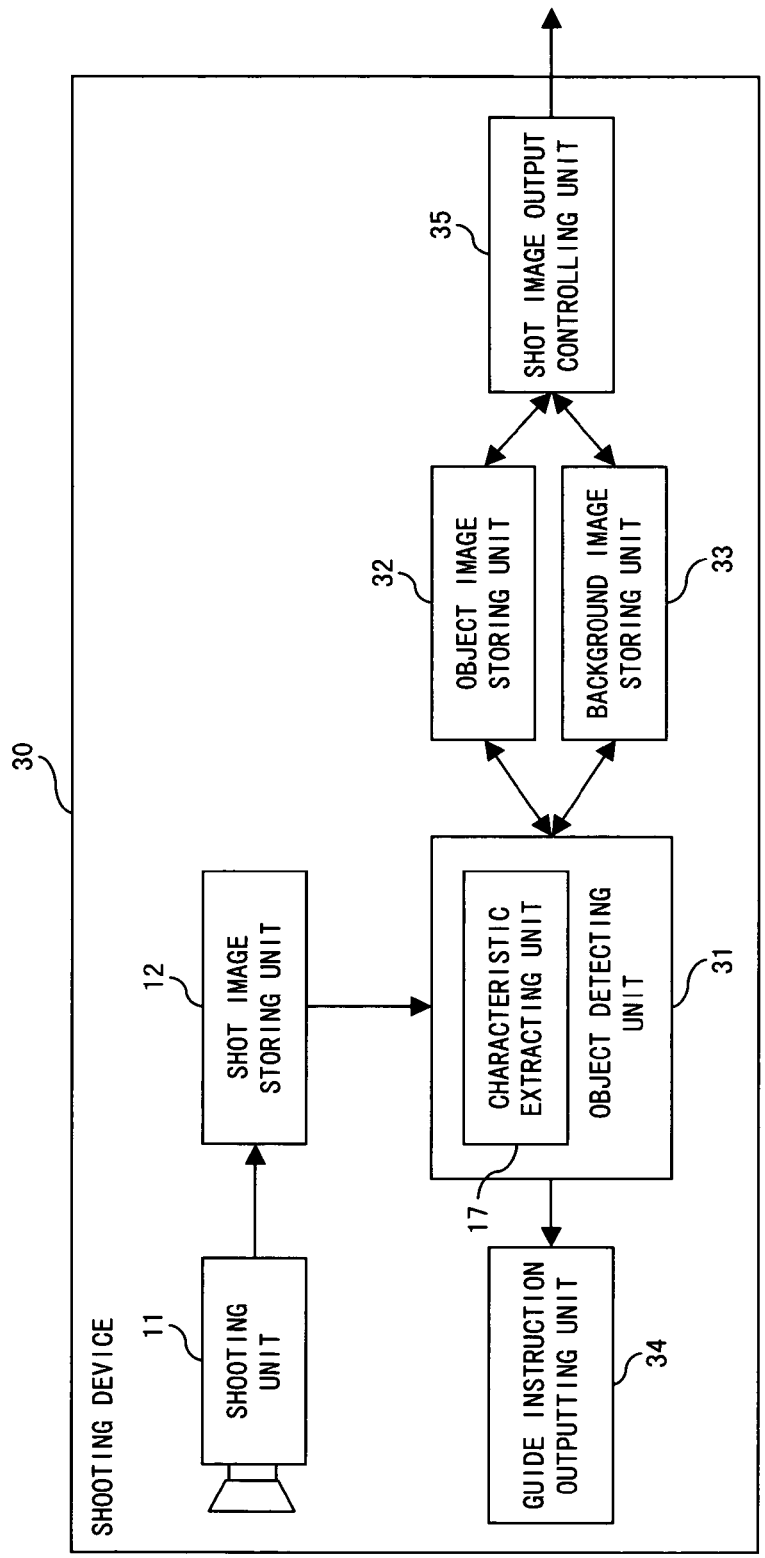
FIG. 11 is a block diagram showing the configuration of a shooting device according to a third embodiment.

FIG. 11 is a block diagram showing the configuration of a shooting device according to a third embodiment. The shooting device 30 according to the third embodiment comprises a shooting unit 11, a shot image storing unit 12, an object detecting unit 31, an object image storing unit 32, a background image storing unit 33, a guide instruction outputting unit 34, and a shot image output controlling unit 35. The shooting unit 11 and the shot image storing unit 12 are the same as those described in the first embodiment.

The object detecting unit 31 determines whether or not an image of an object to be shot is included in an image shot by the shooting unit 11. If the image of the object to be shot is included in the image shot by the shooting unit 11, that image is stored in the object image storing unit 32 as an object image. Or, if the image of the object to be shot is not included, that image is stored in the background image storing unit 33 as a background image. However, even if the image of the object to be shot is included, that image is discarded if it is shot in an unsuitable state. Note that the object detecting unit 31 comprises a characteristic extracting unit 17 which analyzes image data stored in the shot image storing unit 12 and extracts its characteristic, and the object detecting unit 31 can recognize whether or not an image of an object to be shot is included based on the output of the characteristic extracting unit 17.

The guide instruction outputting unit 34 creates an instruction to guide an object to be shot based on a result of the determination made by the object detecting unit 31, and outputs the created instruction. The shot image output controlling unit 35 extracts the image of the object to be shot by generating an image of a difference between the object image stored in the object image storing unit 32 and the background image stored in the background image storing unit 32 (background difference process). Then, the shot image output controlling unit 35 transmits the extracted image of the object to be shot to the identifying device 3 shown in FIG. 1. If the background difference process is executed in the identifying device 3, the shot image output controlling unit 35 transmits both the object image and the background image to the identifying device 3.

Figure 12:
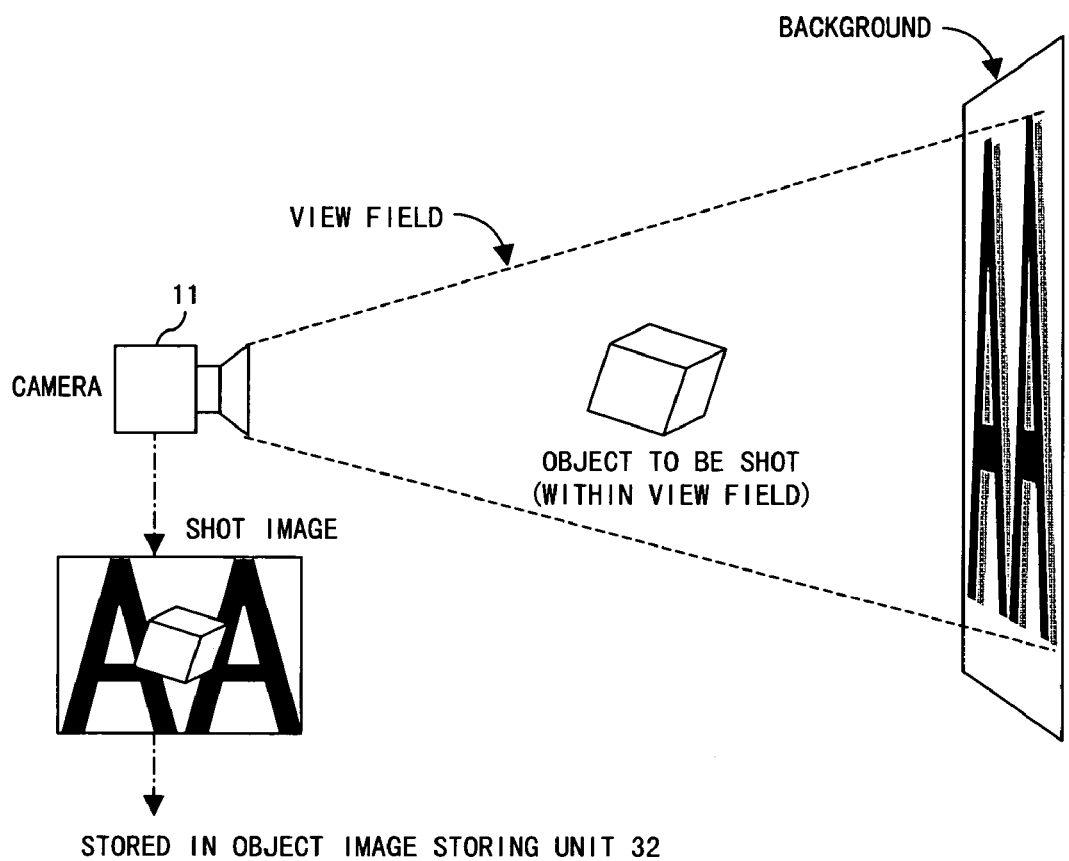
FIGS. 12 and 13 explain the operations of an object detecting unit.
Figure 13:
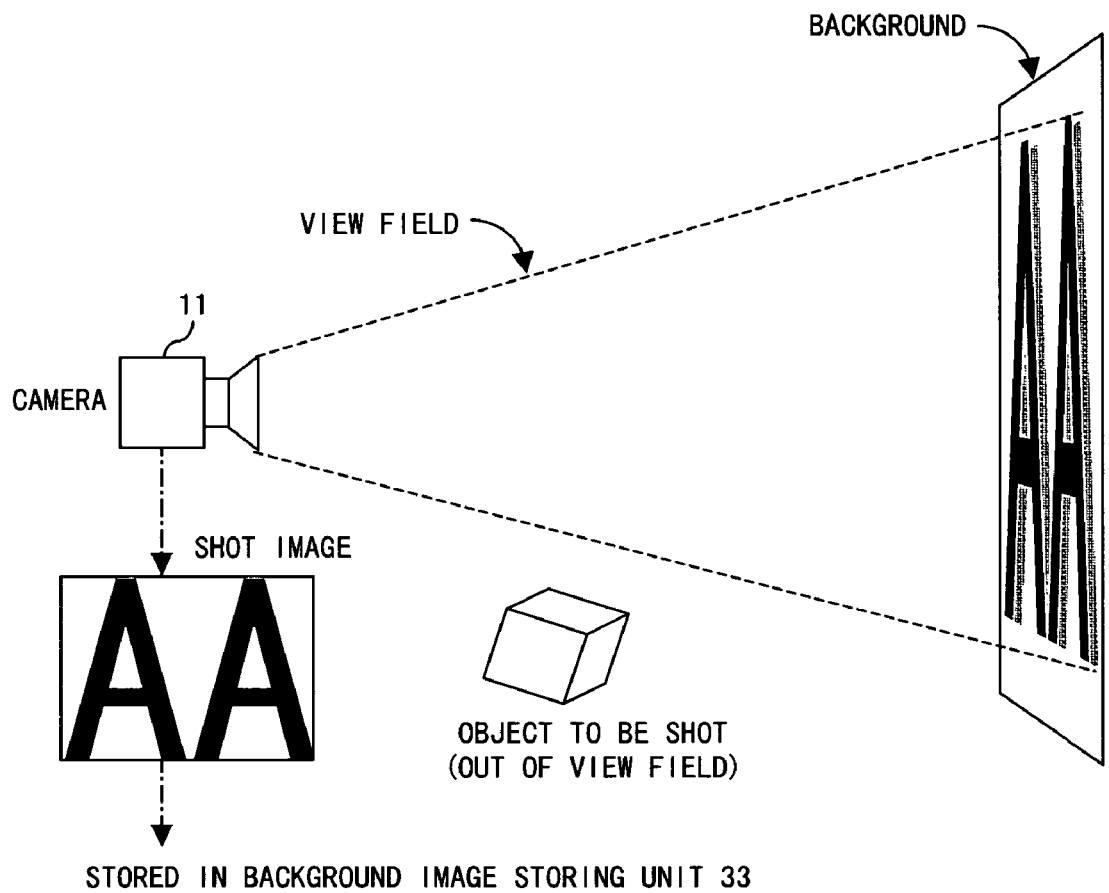

FIGS. 12 and 13 explain the operations of the object detecting unit 31. In the example shown in FIG. 12, an object to be shot is arranged within the photographic view field of the shooting unit 11. Accordingly, an image of the object to be shot is included in an image shot by the shooting unit 11 in this case. Then, the object detecting unit 31 stores this image in the object image storing unit 32 as an object image. Hereafter, the object detecting unit 31 checks whether or not a background image is stored in the background image storing unit 33. If the background image is not stored, the guide instruction outputting unit 34 generates an instruction to guide the object to be shot out of the view field of the shooting unit 11.

A user moves the object to be shot out of the view field as shown in FIG. 13 in accordance with this guide instruction. Thereafter, the shooting unit 11 makes shooting.

In the example shown in FIG. 13, the object to be shot is arranged out of the view field of the shooting unit 11. Accordingly, the image of the object to be shot is not included in the image shot by the shooting unit 11. Then, the object detecting unit 31 stores this image in the background image storing unit 32 as a background image. Hereafter, the object determining unit 31 checks whether or not the object image is stored in the object image storing unit 32. If the object image is not stored, the guide instruction outputting unit 34 generates an instruction to guide the object to be shot to within the view field of the shooting unit 11.

The user moves the object to be shot to within the view field as shown in FIG. 12 in accordance with this guide instruction. Thereafter, the shooting unit 11 makes shooting.

As described above, the shooting device 30 outputs to a user an instruction to guide an object to be shot depending on need in order to obtain both an object image and a background image.

FIGS. 14A through 14D explain one example of a determining method implemented by the object detecting unit 31. Assume that a particular color (red color in this case) is applied to an entire surface of an object to be shot. Also assume that the object detecting unit 31 comprises a function for detecting the proportion (area ratio) of an image in red color to an entire image shot by the shooting unit 11.

Figure 14A:
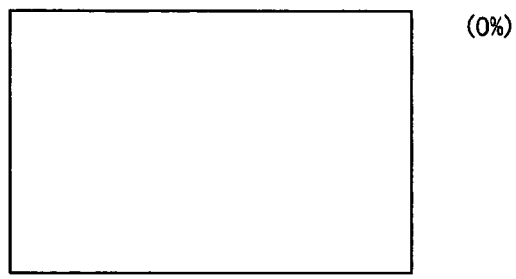
FIGS. 14A through 14D explain one example of a determining method implemented by the object detecting unit.

In the example shown in FIG. 14A, a image in red color is not detected. In this case, the object detecting unit 31 recognizes that the image of the object to be shot does not exist in the image shot by the shooting unit 11, and stores the shot image in the background image storing unit 33.

Figure 14B:
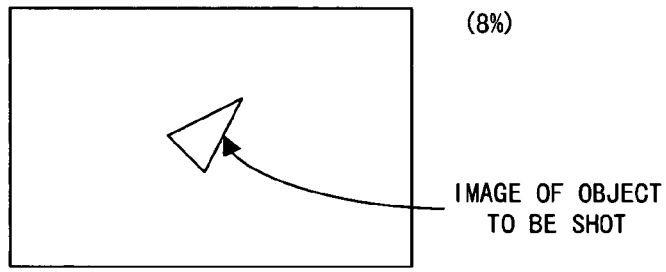

In the example shown in FIG. 14B, the proportion of an image in red color to an entire image is 8 percent. In this case, the object detecting unit 31 determines that the object to be shot is too apart from the shooting unit 11, and discards that image. The object detecting unit 31 determines that the object to be shot is too apart from the shooting unit 11, if the proportion of the image in red color to the entire image is smaller than a predetermined value (for example, 20 percent).

Figure 14C:
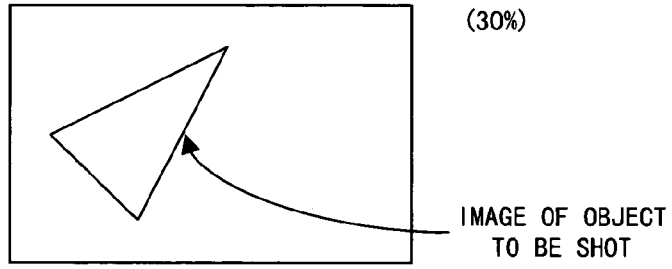

In the example shown in FIG. 14C, the proportion of an image in red color to an entire image is 30 percent. In this case, the object detecting unit 31 determines that the object to be shot is arranged in an expected position, and stores the image in the object image storing unit 32. The object detecting unit 31 determines that the object to be shot is arranged in the expected position, if the proportion of the image in red color to the entire image is within a predetermined range (for example, 20 to 40 percent).

Figure 14D:
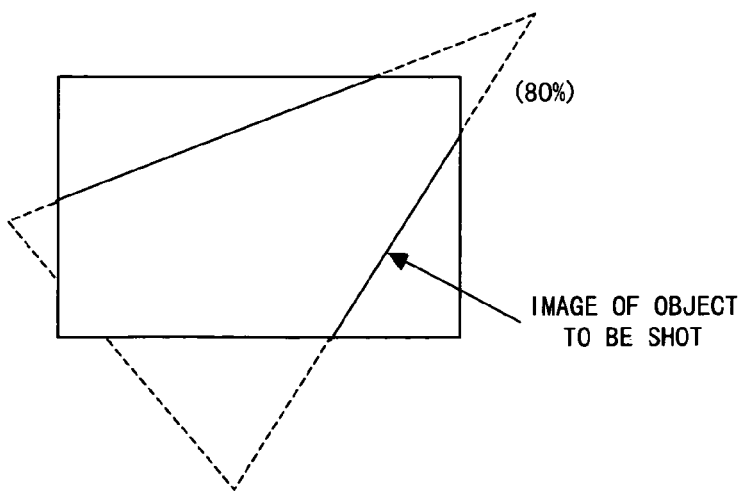

In the example shown in FIG. 14D, the proportion of an image in red color to an entire image is 80 percent. In this case, the object detecting unit 31 determines that the object to be shot is too close to the shooting unit 11, and discards the image. The object detecting unit 31 determines that the object to be shot is too close to the shooting unit 11, if the proportion of the image in red color to the entire image is larger than a predetermined value (for example, 40 percent).

FIG. 15 is a flowchart showing the operations of the shooting device 30 according to the third embodiment. In step S21, an image shot by the shooting unit 11 is stored in the shot image storing unit 12. In step S22, a predetermined image process (such as a color component analysis process, etc.) is executed for the image stored in the shot image storing unit 12.

Instep S23, the proportion ("ratio A") of an image having a particular color component to an entire image is calculated. In step S24, a comparison is made between the "ratio A" and preset threshold values.

If the "ratio A" is "smaller than a threshold value T3", an image of an object to be shot is not included in the shot image. Then, in step S25, that image is stored in the background image storing unit 33. In the examples shown in FIGS. 14A through 14D, the threshold value T3 is, for example, 5 percent. Then, in step S26, it is determined whether or not an object image is stored in the object image storing unit 32. If the object image is not stored in the object image storing unit 32, an instruction to guide the object to be shot to within the view field of the shooting unit 11 is output. Or, if the object image is stored, the process is terminated because both the object image and the background image have been obtained.

If the "ratio A" is "larger than a threshold value T1 and smaller than a threshold value T2", the image of the object to be shot is recognized to be included in the shot image. Then, in step S28, that image is stored in the object image storing unit 32. In the examples shown in FIGS. 14A through 14D, the threshold values T1 and T2 are respectively 20 and 40 percent. Then, in step S29, it is determined whether or not a background image is stored in the background image storing unit 33. If the background image is not stored in the background image storing unit 33, an instruction to guide the object to be shot out of the view field of the shooting unit 11 is output in step S27. Or, if the background image is stored, the process is terminated because both the object image and the background image have been obtained.

Note that a user moves the object to be shot in accordance with the guide instruction in step S27 or S30. Thereafter, the flow goes back to step S21, and the shooting unit 11 makes shooting. In this way, both the object image and the background image are obtained.

If the "ratio A" is "larger than the threshold value T3 and smaller than the threshold value T1", or "larger than the threshold value T2", it is determined that the object to be shot is arranged in an unsuitable position although its image is included in the shot image. In this case, that image is discarded in step S31. Then, in step S32, a process for guiding the object to be shot to an expected position is executed. Namely, if the "ratio A" is larger than the threshold value T3 and smaller than the threshold value T1, a guide instruction to make the object to be shot close to the shooting unit 11 is output. Or, if the "ratio A" is larger than the threshold value T2, a guide instruction to move the object to be shot away from the shooting unit 11 is output. Thereafter, the flow goes back to step S21.

FIG. 16 is a block diagram showing the configuration of a shooting device according to a fourth embodiment. The shooting device 40 according to the fourth embodiment comprises a shooting unit 11, a shot image storing unit 12, a distance measuring unit 41, an object detecting unit 42, an object image storing unit 32, a background image storing unit 33, a guide instruction outputting unit 34, and a shot image output controlling unit 35. Here, the shooting unit 11, the shot image storing unit 12, the object image storing unit 32, the background image storing unit 33, the guide instruction outputting unit 34, and the shot image output controlling unit 35 are the same as those described in the first or the third embodiment.

The distance measuring unit 41 is, for example, a known distance sensor, and measures the distance between the shooting unit 11 and an object to be shot.

The object detecting unit 42 determines whether or not an image of an object to be shot is included in an image shot by the shooting unit 11 similar to the object detecting unit 31 in the third embodiment. If the image of the object to be shot is included in the image shot by the shooting unit 11, that image is stored in the object image storing unit 32 as an object image. Or, if the image of the object to be shot is not included, that image is stored in the background image storing unit 33 as a background image. Note that the object detecting unit 42 determines whether or not the image of the object to be shot is suitably included in the shot image based on the output of the distance measuring unit 41.

FIG. 17 is a flowchart showing the operations of the shooting device 40 according to the fourth embodiment. Processes of steps S21 and S25 through S32 are the same as those described with reference to FIG. 15.

In step S41, the distance (distance A) between the shooting unit 11 and an object to be shot is calculated based on the output of the distance measuring unit 41. In step S42, a comparison is made between the "distance A" and preset threshold values.

If the "distance A" is "larger than a threshold value T3 (for example, 16 cm), an image of the object to be shot is determined not to be included in a shot image. Then, the flow goes to step S25. Or, if the "distance A" is "larger than a threshold value T1 (for example, 4 cm) and "smaller than a threshold value T2 (for example, 8 cm), the image of the object to be shot is included in the shot image, and the flow goes to step S28. Or, if the "distance A" is "smaller than the threshold value T1" or "larger than the threshold value T2 and smaller than the threshold value T3", it is determined that the object to be shot is arranged in an unsuitable position although its image is included in the shot image. In this case, the flow goes to step S31.

As described above, the operations of the shooting device 40 according to the fourth embodiment are fundamentally the same as those of the shooting device 30 according to the third embodiment. However, in the fourth embodiment, the distance from the shooting unit 11 to an object to be shot is directly measured with a distance sensor, etc. Accordingly, even if the distance the shooting unit 11 and an object to be shot cannot be estimated only with an image analysis, whether or not an object to be shot comes out can be determined without fail.

Additionally, with the shooting device according to the third or the fourth embodiment, an object area and a background area can be isolated, whereby an image in which only a background image is changed can be generated while holding an image of an object to be shot.

The above described first to the fourth embodiments provide the function for guiding an object to be shot to a suitable position or posture, and improve the identification accuracy of an object with this function. However, supposing that a background image is unsuitable, there is a possibility that an object to be shot cannot be accurately extracted even if an image where the object comes out is analyzed. Namely, if the background image is unsuitable, the identification accuracy of the object can possibly degrade. Accordingly, it is desirable to prepare a suitable background image beforehand in order to improve the identification accuracy of the object. For this reason, a shooting device according to a fifth embodiment has a function for obtaining a suitable background image beforehand.

FIG. 18 is a block diagram showing the configuration of the shooting device according to the fifth embodiment. The shooting device 50 according to the fifth embodiment comprises a shooting unit 11, a shot image storing unit 12, an expected background shooting state storing unit 51, a background shooting state determining unit 52, and a shooting device guide instruction outputting unit 53. The shooting unit 11 and the shot image storing unit 12 are the same as those described in the first embodiment.

In the expected background shooting state storing unit 51, information which represents a state desirable as a background image is stored as expected background shooting state information. Generally, if a background is too bright, an image of an object to be shot cannot be possibly extracted with accuracy when the image in which the object comes out is analyzed. Additionally, an image of an object cannot be possibly extracted with accuracy also if the brightness distribution of a background is uneven. Accordingly, in this case, for example, information which defines the brightness of a background image, or information which defines the brightness distribution of a background image may be stored as expected background shooting state information. Or, image data obtained by shooting a suitable background (expected background) prepared beforehand may be available.

The background shooting state determining unit 52 references the expected background shooting state information, and determines whether or not the background image (image in which the object to be shot does not come out) obtained by the shooting unit 11 is suitable. If the background shooting state determining unit 52 determines that the background image is not suitable, it determines how the position or the posture of the shooting unit 11 is to be guided. Note that the background shooting state determining unit 52 comprises a characteristic extracting unit 17 which analyzes image data stored in the shot image storing unit 12 and extracts its characteristic, and the background shooting state determining unit 52 can recognize the state (brightness distribution, etc.) of a background image based on the output of the characteristic extracting unit 17.

The shooting device guide instruction outputting unit 53 outputs a guide instruction to a user based on a result of the determination made by the background shooting state determining unit 52. In accordance with this instruction, the user can move the shooting unit 11 to a suitable position. Or, the shooting device guide instruction outputting unit 53 may move/rotate the shooting unit 11 based on the result of the determination made by the background shooting state determining unit 52.

Operations of the shooting device 50 according to the fifth embodiment are described next with reference to FIGS. 19 and 20. Here, assume that shooting is made in a state where an object to be shot does not exist within the view field of the shooting unit 11, and its image is stored in the shot image storing unit 12. Hereinafter, this image is referred to as a background image.

In the example shown in FIG. 19, the brightness of an upper area of a background image obtained by the shooting unit 11 is high, whereas that of a lower area is low. In this case, the background shooting state determining unit 52 analyzes the brightness distribution of this background image, and determines that the shooting unit 11 is to be guided downward (or the shooting unit 11 is to be oriented downward) upon detection that the brightness of the upper area is higher than that defined as expected background shooting state information. A result of this determination is notified to a user as a guide instruction by the shooting device guide instruction outputting unit 53.

In the example shown in FIG. 20, an image of a fluorescent light is included in a background image obtained by the shooting unit 11. In this case, the brightness of an area (the rightmost area in this example), which corresponds to the fluorescent light, becomes high in this background image. The background shooting state determining unit 52 analyzes the brightness distribution of the background image, and determines that the shooting unit 11 is to be guided leftward (or the shooting unit 11 is to be oriented leftward) upon detection that the brightness of the rightmost area is higher than that defined as expected background shooting state information. A result of this determination is notified to a user as a guide instruction by the shooting device guide instruction outputting unit 53.

The user moves or rotates the shooting unit 11 in accordance with the guide instruction from the shooting device guide instruction outputting unit 53. As a result, the shooting device according to the fifth embodiment can obtain a suitable background image. Namely, a background image the brightness of which is low, or a background image the brightness distribution of which is even can be obtained. Accordingly, if an object to be identified is shot under the environment where this background image is obtained, its identification accuracy is improved.

FIG. 21 is a flowchart showing the operations of the shooting device 50 according to the fifth embodiment. In step S51, a background image is shot by the shooting unit 11, and stored in the shot image storing unit 12. The "background image" indicates an image which is shot in a state where an object to be shot does not exist within the view field of the shooting unit 11.

In step S52, the brightness and the brightness distribution of the entire image are calculated by analyzing the background image stored in the shot image storing unit 12. Note that this process is executed by the characteristic extracting unit 17. In steps S53 and S54, brightness information stored in the expected background shooting state storing unit 51 is referenced, and it is determined whether or not the brightness or the brightness distribution calculated in step S52 is within an allowable range.

If the brightness or the brightness distribution of the background image is not within the allowable range, how the shooting unit 11 is to be guided is determined to obtain a background image the brightness of which is lower, or a background image the brightness distribution of which is even in step S55. Then, in step S56, a result of the determination is output as a guide instruction.

A user moves or rotates the shooting unit 11 in accordance with the guide instruction. Then, the flow goes back to step S51, and the next background image is shot. The processes of steps S51 through S56 are repeatedly executed until the brightness or the brightness distribution of the background image obtained by the shooting unit 11 falls within the allowable range.

The functions provided by the shooting devices according to the first through the fifth embodiments can be arbitrarily combined. Namely, for example, the position or the angle of the shooting unit 11 may be guided with the function provided by the fifth embodiment, and shooting may be made thereafter while guiding the position or the posture of an object to be shot with the functions provided by the first through the fourth embodiments. Additionally, for example, shooting may be made while modifying the posture of an object to be shot with the function provided by the second embodiment, after the object to be shot is guided to a suitable position with the function provided by the first embodiment.

A method outputting a guide instruction is described next. Description is provided below based on the shooting device according to the first embodiment. However, the method is not limited to this shooting device, and also applicable to the shooting devices according to the second through the fifth embodiments.

A shooting device shown in FIG. 22 comprises a character string generating unit 61 and a display device 62. The character string generating unit 61 generates a character string which corresponds to a guide instruction decided by the guide direction determining unit 14. The display device 62 displays the character string generated by the character string generating unit 61. This character string is a guide message to instruct the move direction, move amount, rotation direction, or rotation angle of an object to be shot or the shooting unit 11. Here, it is easy to instantaneously display the generated character string. Accordingly, with this method, a user can quickly modify the position or the posture of an object to be shot or the shooting unit 11, leading to a reduction in the processing time for identifying the object.

Figure 23:
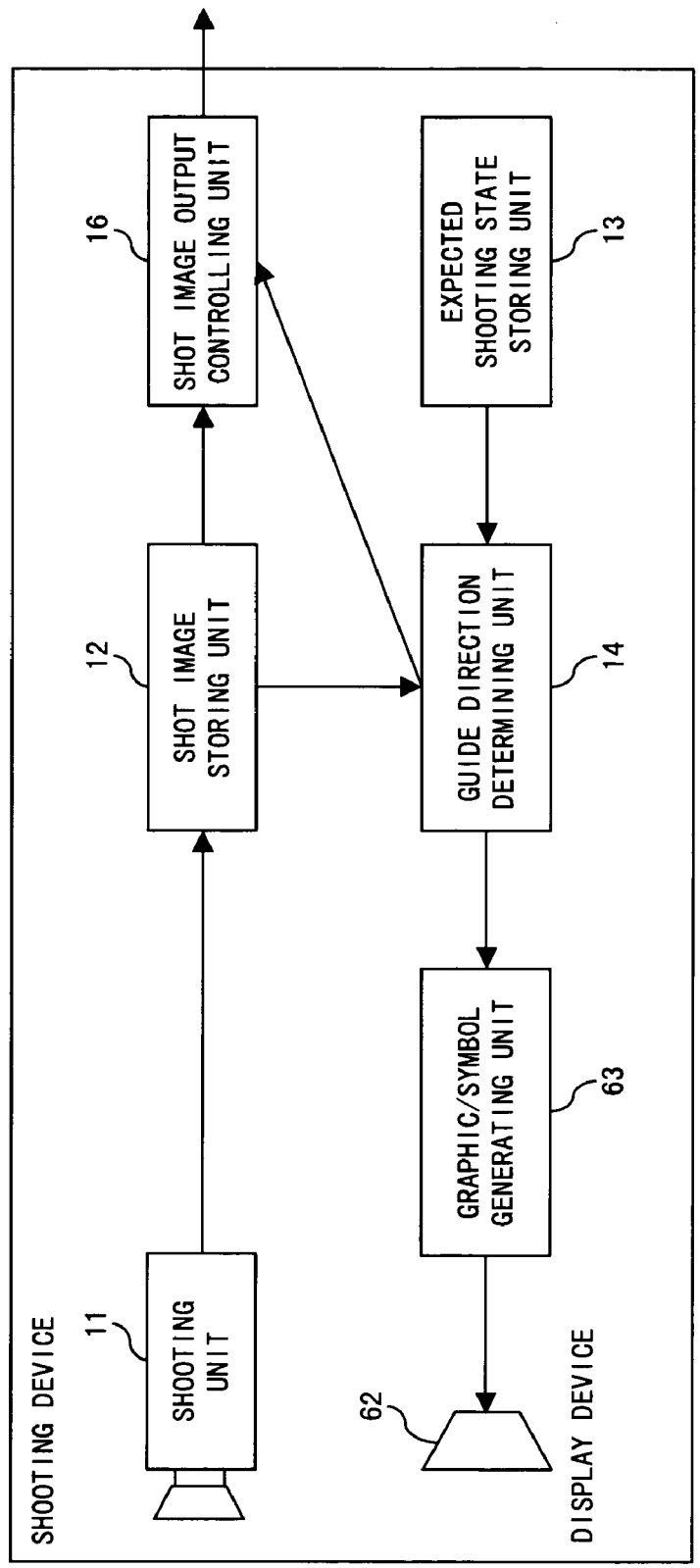

A shooting device shown in FIG. 23 comprises a graphic/symbol generating unit 63 and a display device 62. The graphic/symbol generating unit 63 generates a graphic/symbol, which corresponds to a guide instruction decided by the guide direction determining unit 14. The display device 62 displays the graphic/symbol generated by the graphic/symbol generating unit 63. This graphic/symbol is, for example, an arrow mark which instructs the move direction, move amount, rotation direction, or rotation angle of an object to be shot or the shooting unit 11. Accordingly, with this device, even a user (such as a foreigner), who cannot read a message displayed with the method shown in FIG. 22, can quickly modify the position or the posture of an object to be shot or the shooting unit 11.

Figure 24:
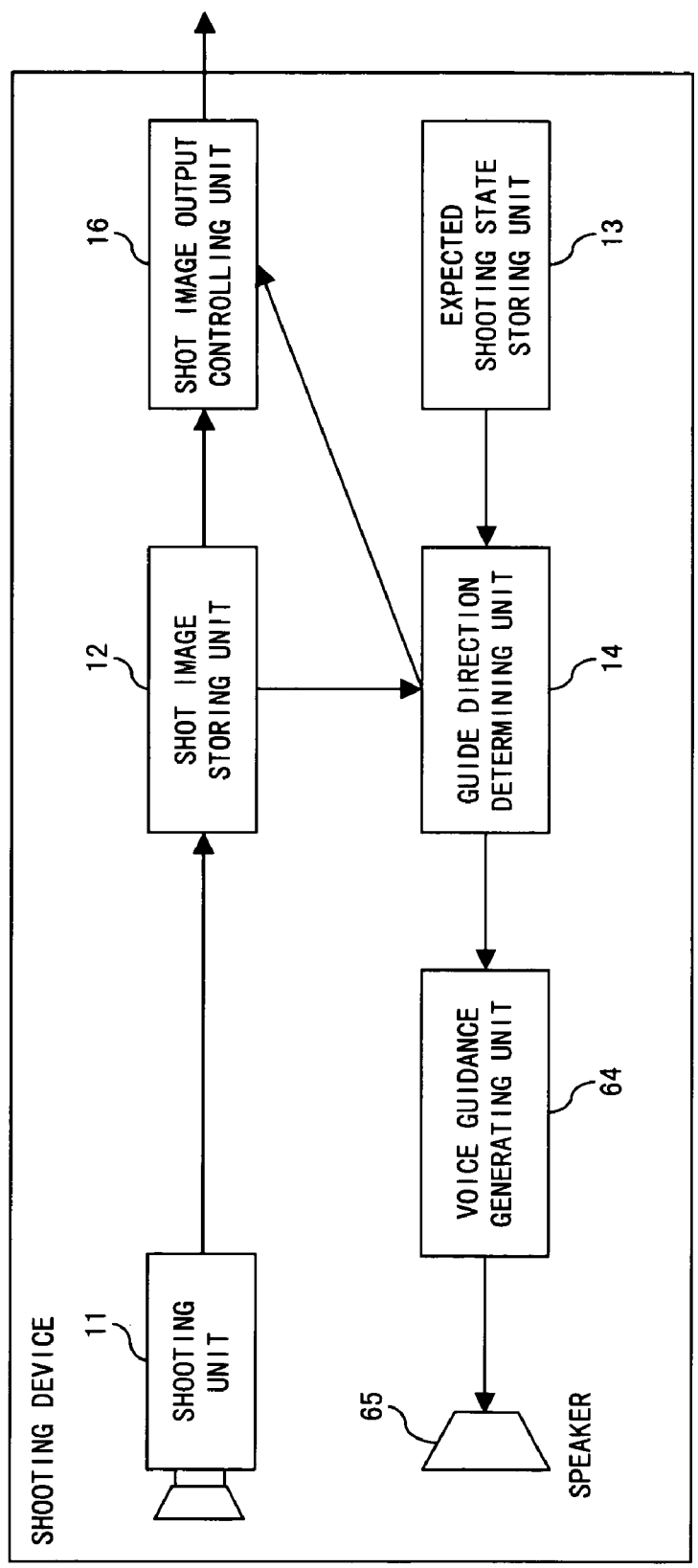

A shooting device shown in FIG. 24 comprises a voice guidance generating unit 64 and a speaker 65. The voice guidance generating unit 64 generates voice guidance which corresponds to a guide instruction decided by the guide direction determining unit 14, and outputs the voice guidance via the speaker 65. Here, the voice guidance is a message which instructs the move direction, move amount, rotation direction, or rotation angle of an object to be shot or the shooting unit 11. Accordingly, with this device, even a visually impaired user can modify the position or the posture of an object to be shot or the shooting unit 11.

Figure 25:
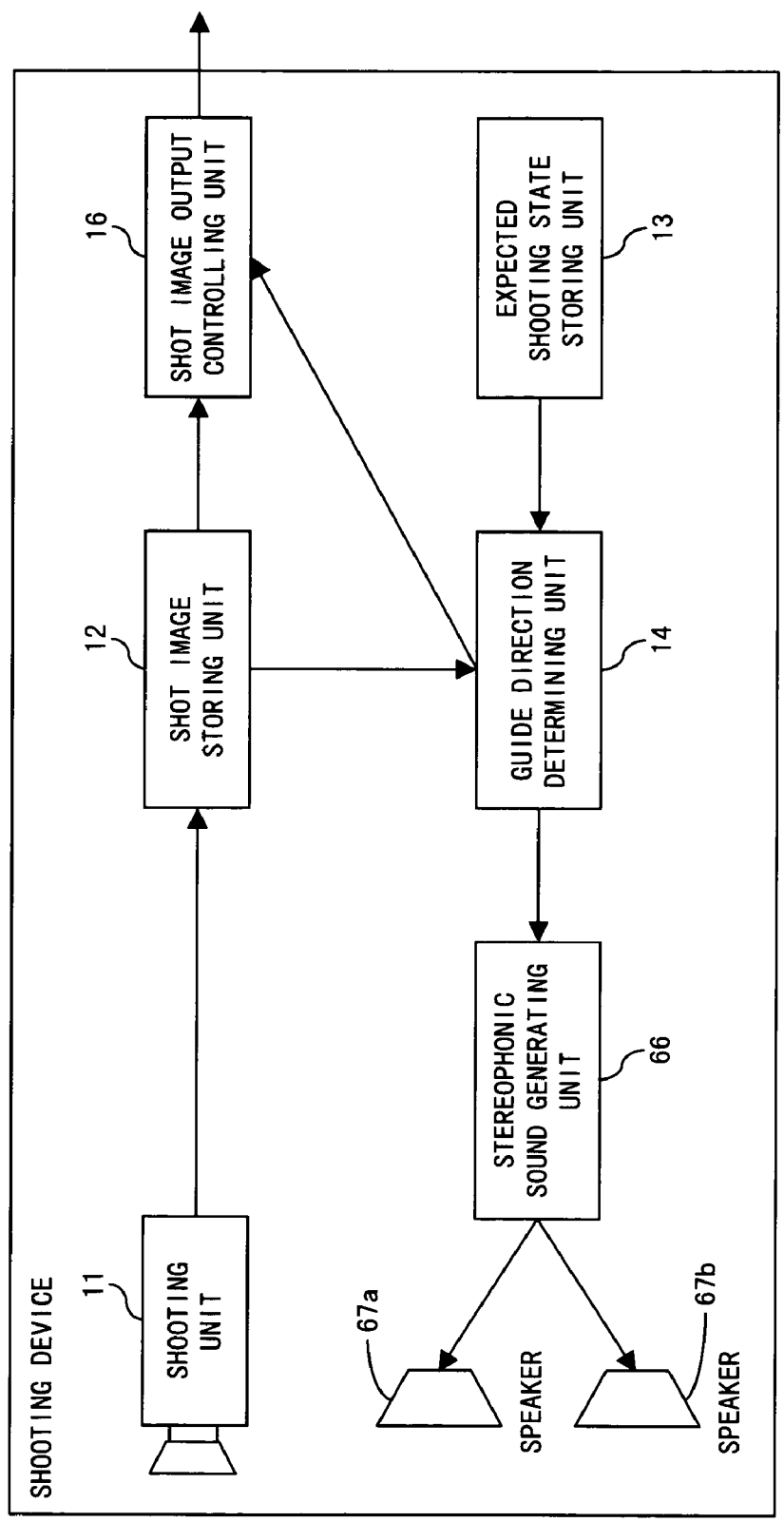

A shooting device shown in FIG. 25 comprises a stereophonic sound generating unit 66 and a plurality of speakers 67a and 67b. The stereophonic sound generating unit 66 generates guide sound which corresponds to a guide instruction decided by the guide direction determining unit 14, and outputs the guide sound via the speakers 67a and 67b. Here, this guide sound instructs the move direction, move amount, rotation direction, or rotation angle of an object to be shot or the shooting unit 11. Specifically, the guide instruction is represented by a direction where guide sound is heard, the volume of guide sound, the tone of guide sound, a cycle of the guide sound if guide sound is cyclically output, or the like. For example, sound which is higher than reference sound is output as guide sound if an object to be shot is desired to be brought close to the shooting unit 11, or sound which is lower than the reference sound is output as guide sound if the object to be shot is desired to be moved away from the shooting unit 11. At this time, the pitch of the guide sound is assumed to continuously vary according to the distance from the shooting unit 11 to an object to be shot.

Figure 26:
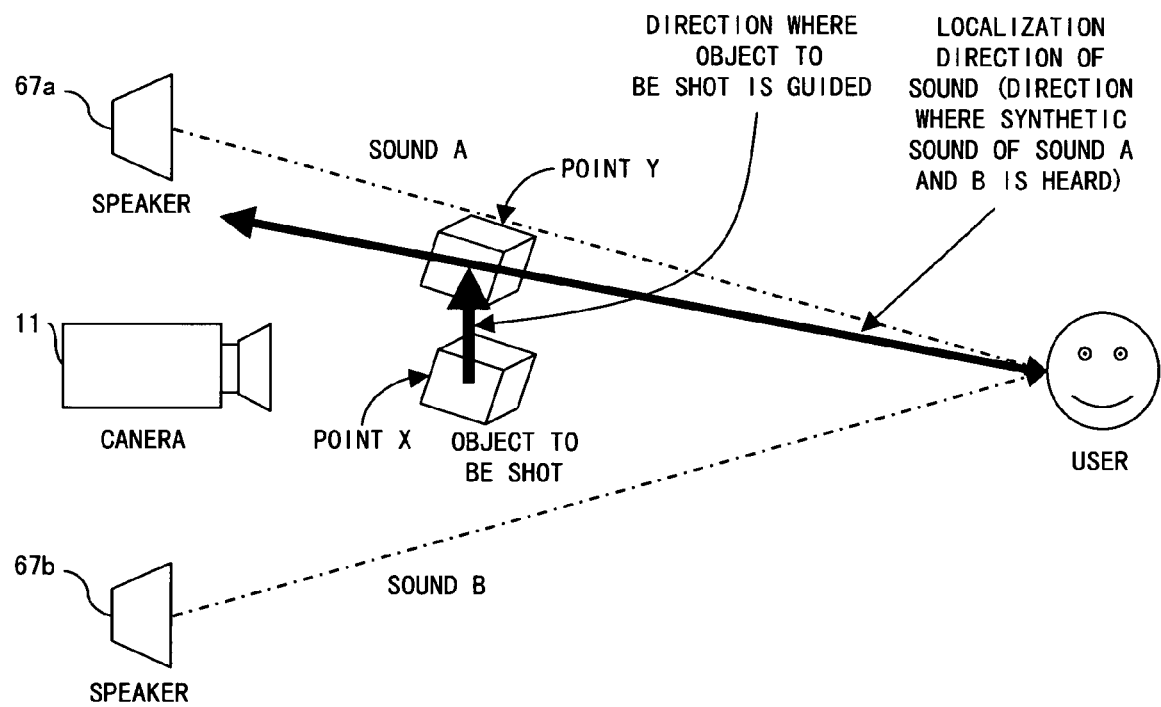
FIG. 26 shows a specific example of the method shown in FIG. 25.

FIG. 26 explains a method guiding an object to be shot by using guide sound. In this example, an object to be shot is currently arranged in a point X. Here, the guide direction determining unit 14 is assumed to determine that the object to be shot is to be guided to a point Y. Additionally, a user is assumed to hear the synthetic sound of sound A output from the speaker 67*a* and sound B output from the speaker 67*b*. In this case, the volumes of the speakers 67*a* and 67*b* are adjusted so that the localization direction of the synthetic sound with reference to the user becomes a direction from the user toward the point Y. As a result, the user hears the guide sound from the direction of the point Y, so that he or she can move the object to be shot, which is located at the point X, to the point Y.

Figure 27:
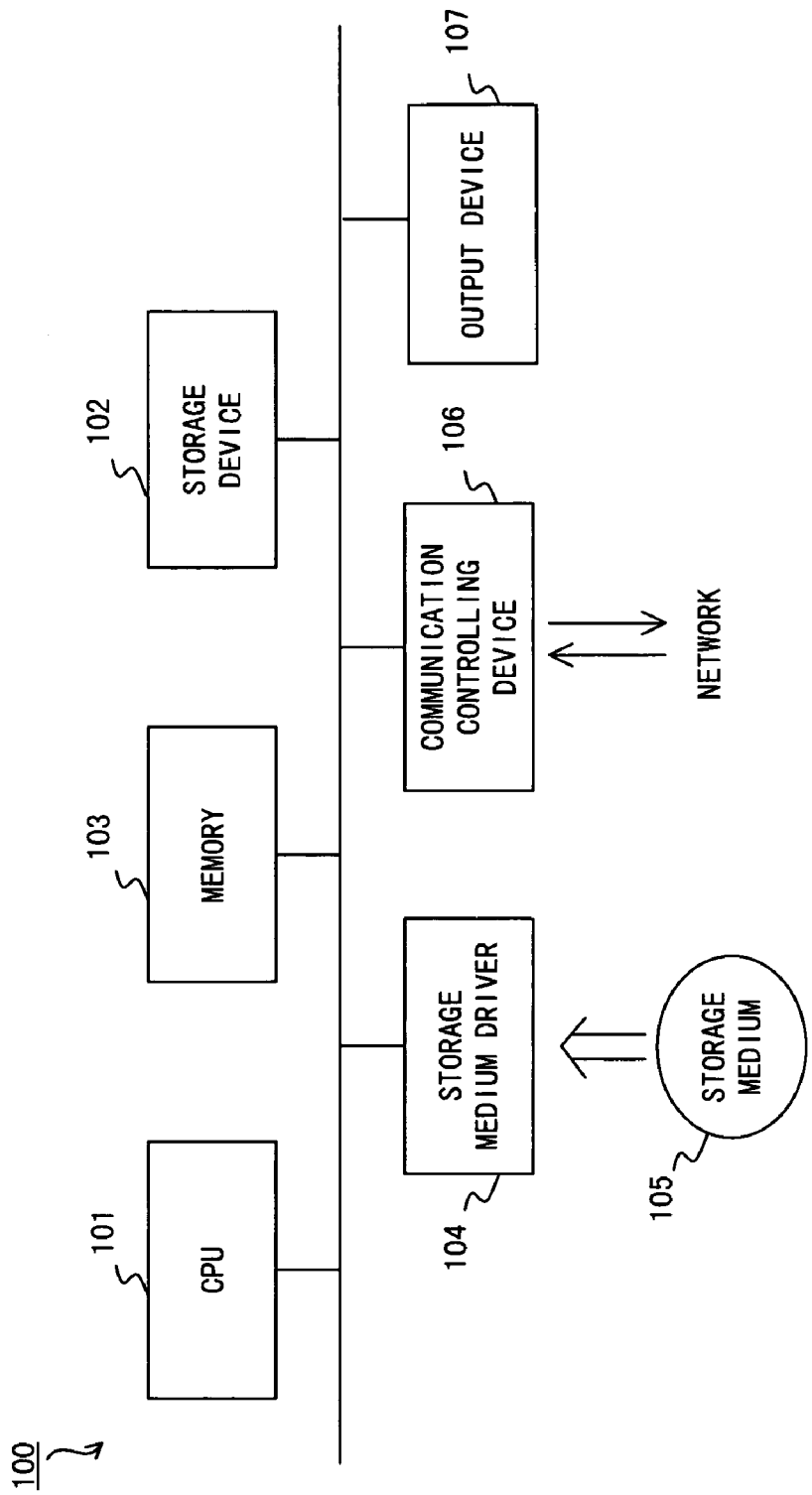
FIG. 27 is a block diagram showing a computer providing guidance functions according to the present invention.

FIG. 27 is a block diagram showing a computer providing the guide instruction functions (the guide direction determining unit 14, the guide posture determining unit 22, the object detecting units 31 and 42, etc.) according to the present invention. The guide instruction functions according to the present invention are implemented by executing a program, which describes the processes of the above described flowcharts, with a computer.

A CPU 101 loads the program, which describes the processes represented by the above described flowcharts, from a storage device 102 into a memory 103, and executes the program. The storage device 102 is, for example, a hard disk, and stores the above described program. The storage device 102 may be an external storage device connected to the computer 100. The memory 103 is, for example, a semiconductor memory, and used as a working area of the CPU 101. Here, expected shooting state information and expected background shooting state information are stored, for example, in the storage device 102. Additionally, the shot image storing unit 12, the object image storing unit 32, and the background image storing unit 33 are implemented, for example, by the memory 103.

A storage medium driver 104 accesses a portable storage medium 105 in accordance with an instruction of the CPU 101. The portable storage medium 105 includes, for example, a semiconductor device (PC card, etc.), a medium (flexible disk, magnetic tape, etc.) to/from which information is input/output with a magnetic action, and a medium (optical disk, etc.) to/from which information is input/output with an optical action. A communication controlling device 106 transmits/receives data via a network in accordance with an instruction of the CPU 101. An output device 107 is, for example, a display device or a speaker, and outputs a generated guide instruction.

FIG. 28 explains a method providing a software program according to the present invention. The program according to the present invention is provided, for example, with an arbitrary one of the following three methods.

(1) Provided by being installed in a computer. In this case, the program is, for example, preinstalled in the computer 100 prior to its shipment.
(2) Provided by being stored onto a portable storage medium. In this case, the program stored onto the portable storage medium 105 is fundamentally installed in the storage device 102 via the storage medium driver 104.
(3) Provided from a program server arranged on a network. In this case, the computer 100 obtains the corresponding program by downloading the program from the program server. Or, the computer 100 may request the server device to execute the above described program, and may receive a result of the execution.

According to the present invention, an object to be shot can be guided to a suitable position and posture, whereby a satisfactory image for identifying the object can be obtained. Accordingly, the accuracy of identifying the object is improved.

Furthermore, since the position or the angle of a shooting device can be guided to allow a suitable background image to be obtained, an image of an object to be shot can be accurately extracted, which also leads to improvements in the accuracy of identifying the object.

What is claimed is:

1. A shooting device, comprising:
a shooting unit which shoots a physical object as a shooting target, a position of the physical object being movable;
an expected shooting state storing unit which stores expected shooting state information which represents an expected position of the physical object;
a guide determining unit which determines how the physical object is to be guided to the expected position based on the expected shooting state information and an image shot by said shooting unit, said guide determining unit determines whether the physical object should be moved close to said shooting unit or away from said shooting unit by comparing a size of the physical object in the image shot by said shooting unit and a size of the physical object represented by the expected shooting state information;
a guide instruction outputting unit which instructs how the physical object is to be guided to the expected position based on a result of the determination made by said guide determining unit, said guide instruction outputting unit outputs a guidance instruction for moving the physical object close to said shooting unit or moving the physical object away from said shooting unit, based on determination by said guide determining unit; and
an image outputting unit which outputs the image shot by said shooting unit, wherein:
the physical object possesses a physical line pattern including physical lines that are a part of the physical object;
a number of physical lines or a total length of physical lines to be shot by said shooting unit is defined as the expected shooting state information; and
said guide determining unit determines that the physical object is not required to be guided, if the number of the physical lines included in the physical line pattern possessed by the physical object or the total length of the physical lines included in the physical line pattern possessed by the physical object, which is detected from an image of the physical object shot by said shooting unit, is larger than the number of physical lines or the total length of physical lines, which is defined as the expected shooting state information.

2. The shooting device according to claim 1, wherein:
said guide determining unit determines a direction where the physical object is to be guided.

3. The shooting device according to claim 1, wherein:
the expected shooting state information includes information which represents an expected posture of the physical object; and
said guide determining unit determines a rotation direction where the physical object is to be guided.

4. The shooting device according to claim 1, further comprising:
an object detecting unit which determines whether or not an image of a physical object to be shot is included in the image shot by said shooting unit;

an object image storing unit which stores the image shot by said shooting unit as an object image in a case where the image of the physical object is included; and a background image storing unit which stores the image shot by said shooting unit as a background image in a case where the image of the physical object is not included, wherein said image outputting unit extracts the image of the physical object based on the object image and the background image, and outputs the extracted image.

5. The shooting device according to claim 1, further comprising:

an object detecting unit which determines whether or not an image of a physical object to be shot is included in the image shot by said shooting unit;

an object image storing unit which stores the image shot by said shooting unit as an object image in a case where the image of the physical object is included; and a background image storing unit which stores the image shot by said shooting unit as a background image in a case where the image of the physical object is not included, wherein said image outputting unit outputs both the object image and the background image.

6. The shooting device according to claim 4, wherein said guide determining unit guides the physical object in such a way that the image obtained by said shooting unit includes the physical object if the object image is not stored in said object image storing unit, and guides the physical object in such a way that the image obtained by said shooting unit does not include the physical object if the background image is not stored in said background image storing unit.

7. The shooting device according to claim 1, further comprising:

a measuring unit which measures a distance between said shooting unit and the physical object;

an object detecting unit which determines whether or not an image of a physical object to be shot is included in the image shot by said shooting unit based on a result of measurement made by said measuring unit;

an object image storing unit which stores the image shot by said shooting unit as an object image in a case where the image of the physical object is included; and a background image storing unit which stores the image shot by said shooting unit as a background image in a case where the image of the physical object is not included, wherein said image outputting unit extracts the image of the physical object based on the object image and the background image, and outputs the extracted image.

8. The shooting device according to claim 1, further comprising:

a measuring unit which measures a distance between said shooting unit and the physical object;

an object detecting unit which determines whether or not an image of a physical object to be shot is included in the image shot by said shooting unit based on a result of measurement made by said measuring unit;

an object image storing unit which stores the image shot by said shooting unit as an object image in a case where the image of the physical object is included; and a background image storing unit which stores the image shot by said shooting unit as a background image in a case where the image of the physical object is not included, wherein said image outputting unit outputs both the object image and the background image.

9. The shooting device according to claim 7, wherein said guide determining unit guides the physical object in such a way that the image obtained by said shooting unit includes the physical object if the object image is not stored in said object image storing unit, and guides the physical object in such a way that the image obtained by said shooting unit does not include the physical object if the background image is not stored in said background image storing unit.

10. The shooting device according to claim 1, wherein said image outputting unit outputs the image shot by said shooting unit if said guide determining unit determines that the physical object is not required to be guided.

11. The shooting device according to claim 1, further comprising a detecting unit which detects a proportion of area of the image in a particular color to a whole area of the image shot by said shooting unit, wherein said guide determining unit determines a direction where the physical object is to be guided based on a result of detection made by said detecting unit.

12. The shooting device according to claim 1, wherein said guide instruction outputting unit comprises a display unit, and displays a character string corresponding to the result of the determination made by said guide determining unit, on said display unit.

13. The shooting device according to claim 1, wherein said guide instruction outputting unit comprises a display unit, and displays a graphic or a symbol corresponding to the result of the determination made by said guide determining unit, on said display unit.

14. The shooting device according to claim 1, wherein said guide instruction outputting unit outputs voice guidance corresponding to the result of the determination made by said guide determining unit.

15. The shooting device according to claim 1, wherein said guide instruction outputting unit generates stereophonic sound corresponding to the result of the determination made by said guide determining unit.

16. A method of guiding a physical object to be shot with a shooting device, comprising:

shooting the physical object as a shooting target with the shooting device, the physical object possessing a physical line pattern including physical lines that are a part of the physical object, and a position of the physical object being movable;

determining how the physical object is to be guided based on expected shooting state information, which represents an expected position of the physical object, and an image shot by the shooting device, said determining including determining whether the physical object should be moved close to the shooting device or away from the shooting device by comparing a size of the physical object in the image shot by the shooting device and a size of the physical object represented by the expected shooting state information; and outputting a guide instruction of how the physical object is to be guided to the expected position based on a result of the determining, said outputting including outputting a guidance instruction for moving the physical object close to the shooting device or moving the physical object away from the shooting device, based on a result of said comparing, wherein the expected shooting state information is defined as a number of physical lines or a total length of physical lines to be shot by said shooting device, and said determining further comprises determining that the physical object is not required to be guided if the number of the physical lines included in the physical line pattern possessed by the physical object or the total length of the physical lines included in the physical line pattern possessed by the physical object, which is detected from an image of the physical object shot by said shooting device, is larger than the number of physical lines or the total length of physical lines, which is defined as the expected shooting state information.

17. A method of shooting a physical object with a shooting device, comprising:
- a first step of shooting the physical object as a shooting target with the shooting device, the physical object possessing a physical line pattern including physical lines that are a part of the physical object, and a position of the physical object being movable;
- a second step of determining how the physical object is to be guided based on expected shooting state information which represents an expected position of the physical object, and an image shot by the shooting device, said second step of determining including determining whether the physical object should be moved close to the shooting device or away from the shooting device by comparing a size of the physical object in the image shot by the shooting device and a size of the physical object represented by the expected shooting state information;
- a third step of outputting a guide instruction of how the physical object is to be guided to the expected position based on a result of the determination, said third step of outputting a guide instruction including outputting a guidance instruction for moving the physical object close to the shooting unit or moving the physical object away from the shooting unit, based on a result of said comparing; and
- a fourth step of repeating the first through the third steps until it is determined that the physical object is not required to be guided,
- wherein the expected shooting state information is defined as a number of physical lines or a total length of physical lines to be shot by said shooting device, and
- said second step of determining further comprises determining that the physical object is not required to be guided if the number of the physical lines included in the physical line pattern possessed by the physical object or the total length of the physical lines included in the physical line pattern possessed by the physical object, which is detected from an image of the physical object shot by said shooting device, is larger than the number of physical lines or the total length of physical lines, which is defined as the expected shooting state information.

18. A shooting device, comprising:
- shooting means for shooting a physical object as a shooting target, a position of the physical object being movable;
- storing means for storing expected shooting state information which represents an expected position of the physical object;
- guide determining means for determining how the physical object is to be guided to the expected position based on the expected shooting state information and an image shot by said shooting means, said guide determining means determines whether the physical object should be moved close to said shooting means or away from said shooting means by comparing a size of the physical object in the image shot by said shooting means and a size of the physical object represented by the expected shooting state information;
- guide instruction outputting means for instructing how the physical object is to be guided to the expected position based on a result of the determination made by said guide determining means, said guide instruction outputting means outputs a guidance instruction for moving the physical object close to said shooting means or moving the physical object away from said shooting means based on the determination by said guide determining means; and
- image outputting means for outputting the image shot by said shooting means, wherein:
- the physical object possesses a physical line pattern including physical lines that are part of the physical object;
- a number of physical lines or a total length of physical lines to be shot by said shooting means is defined as the expected shooting state information; and
- said guide determining means determines that the physical object is not required to be guided, if the number of the physical lines included in the physical line pattern possessed by the physical object or the total length of the physical lines included in the physical line pattern possessed by the physical object, which is detected from the image of the physical object shot by said shooting means, is larger than the number of physical lines or the total length of physical lines, which is defined as the expected shooting state information.

* * * * *